(12) United States Patent
Bobick et al.

(10) Patent No.: US 9,311,601 B2
(45) Date of Patent: *Apr. 12, 2016

(54) TECHNIQUES FOR KNOWLEDGE DISCOVERY BY CONSTRUCTING KNOWLEDGE CORRELATIONS USING CONCEPTS OR TERMS

(75) Inventors: Mark Bobick, Indialantic, FL (US); Carl Wimmer, Jalisco (MX)

(73) Assignee: MAKE SENCE, INC., Road Town, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 13/325,368

(22) Filed: Dec. 14, 2011

(65) Prior Publication Data

US 2012/0117053 A1 May 10, 2012

Related U.S. Application Data

(63) Continuation of application No. 11/273,568, filed on Nov. 14, 2005, now Pat. No. 8,108,389.

(60) Provisional application No. 60/627,772, filed on Nov. 12, 2004, provisional application No. 60/637,935, filed on Dec. 21, 2004, provisional application No. 60/694,331, filed on Jun. 27, 2005.

(51) Int. Cl.
*G06F 17/30* (2006.01)
*G06N 5/02* (2006.01)
*G06F 17/27* (2006.01)

(52) U.S. Cl.
CPC ............ *G06N 5/022* (2013.01); *G06F 17/2795* (2013.01); *G06F 17/30864* (2013.01); *G06F 17/30286* (2013.01)

(58) Field of Classification Search
CPC .................................................. G06F 17/30286
USPC ......... 707/706, 722, 736–737, 741, 748, 758, 707/781, 999.003–7; 706/46; 704/9; 715/256; 709/202
See application file for complete search history.

(56) References Cited

U.S. PATENT DOCUMENTS 4,716,572 A 12/1987 Kuhn et al. ...................... 373/88
5,371,673 A 12/1994 Fan .................................... 704/1

(Continued)

FOREIGN PATENT DOCUMENTS

EP 1225517 7/2002 .............. G06F 17/30
JP 4/252375 9/1992 .............. G06F 15/40

(Continued)

OTHER PUBLICATIONS

Niwayama et al., "A Proposal of the Software Search Engine Using the Semantic Web", The Institute of Electronics, Information and Communication Engineers, IEICE Technical Report, vol. 102, No. 704 Mar. 6, 2003, Japan, pp. 27-31.

(Continued)

*Primary Examiner* — Syling Yen
(74) *Attorney, Agent, or Firm* — Allen, Dyer, Doppelt, Milbrath & Gilchrist, P.A.

(57) ABSTRACT

Techniques for identifying knowledge use an graphical user interface for inputting one or more terms to be explored for additional knowledge. Then a search is conducted across one or more sources of information to identify resources containing information about or information associated with said terms. The resources are decomposed into elemental units of information and stored in a data structures called nodes. A group of nodes are stored in a node pool and, from the node pool, correlations of nodes are constructed that represent knowledge.

20 Claims, 10 Drawing Sheets

(56) References Cited

U.S. PATENT DOCUMENTS

| | | | |
|---|---|---|---|
| 5,432,118 A | 7/1995 | Orlowski et al. | 438/444 |
| 5,632,480 A | 5/1997 | Davis et al. | 473/483 |
| 5,684,985 A | 11/1997 | Ahmadi | 707/100 |
| 5,761,418 A * | 6/1998 | Francis et al. | 709/201 |
| 5,761,631 A | 6/1998 | Nasukawa | 704/9 |
| 5,963,940 A | 10/1999 | Liddy et al. | 707/5 |
| 5,985,736 A | 11/1999 | Orlowski et al. | 438/445 |
| 6,092,077 A | 7/2000 | Ahmadi | 707/102 |
| 6,275,817 B1 | 8/2001 | Reed et al. | 706/45 |
| 6,466,971 B1 * | 10/2002 | Humpleman et al. | 709/220 |
| 6,470,351 B1 | 10/2002 | Ahmadi | 707/102 |
| 6,529,934 B1 | 3/2003 | Kawamura et al. | 718/102 |
| 6,615,253 B1 | 9/2003 | Bowman-Amuah | 709/219 |
| 6,628,314 B1 | 9/2003 | Hoyle | 345/854 |
| 6,633,742 B1 | 10/2003 | Turner et al. | 434/350 |
| 6,636,865 B2 | 10/2003 | Ahmadi | 707/102 |
| 6,654,740 B2 | 11/2003 | Tokuda et al. | 707/500 |
| 6,766,320 B1 | 7/2004 | Wang et al. | 707/5 |
| 6,836,768 B1 | 12/2004 | Hirsch | 707/3 |
| 6,879,951 B1 * | 4/2005 | Kuo | 704/10 |
| 6,941,513 B2 | 9/2005 | Meystel et al. | 715/256 |
| 6,986,104 B2 | 1/2006 | Green et al. | 715/234 |
| 7,165,071 B2 | 1/2007 | Fanning et al. | 707/10 |
| 7,249,117 B2 * | 7/2007 | Estes | 706/52 |
| 7,269,789 B2 | 9/2007 | Mitsugi | 715/256 |
| 7,447,683 B2 | 11/2008 | Quiroga et al. | |
| 7,599,930 B1 * | 10/2009 | Burns et al. | |
| 7,684,975 B2 | 3/2010 | Aoki et al. | 704/10 |
| 2001/0056445 A1 | 12/2001 | Meystel et al. | 707/513 |
| 2002/0002450 A1 | 1/2002 | Nunberg et al. | 704/1 |
| 2002/0032740 A1 | 3/2002 | Stern et al. | 707/206 |
| 2002/0040359 A1 | 4/2002 | Green et al. | 707/3 |
| 2002/0052740 A1 | 5/2002 | Charlesworth et al. | 704/220 |
| 2002/0059220 A1 | 5/2002 | Little | 707/5 |
| 2002/0083170 A1 | 6/2002 | Collazo | 709/224 |
| 2002/0152202 A1 | 10/2002 | Perro et al. | 707/3 |
| 2003/0028564 A1 | 2/2003 | Sanfilippo | 707/513 |
| 2003/0050932 A1 | 3/2003 | Pace et al. | 707/100 |
| 2003/0126235 A1 | 7/2003 | Chandrasekar et al. | 709/220 |
| 2003/0163302 A1 | 8/2003 | Yin | 704/9 |
| 2004/0030741 A1 * | 2/2004 | Wolton et al. | 709/202 |
| 2004/0093328 A1 * | 5/2004 | Damle | 707/3 |
| 2004/0117341 A1 | 6/2004 | Varadarajan | 707/1 |
| 2004/0123233 A1 | 6/2004 | Cleary et al. | 715/513 |
| 2004/0163043 A1 | 8/2004 | Baudin et al. | 715/513 |
| 2004/0169683 A1 | 9/2004 | Chiu et al. | 345/776 |
| 2004/0172389 A1 | 9/2004 | Galai et al. | 707/3 |
| 2004/0183837 A1 | 9/2004 | Watanabe et al. | 345/853 |
| 2004/0193520 A1 | 9/2004 | LaComb et al. | 705/35 |
| 2004/0205670 A1 | 10/2004 | Mitsugi | 715/513 |
| 2004/0254904 A1 | 12/2004 | Nelken et al. | 706/50 |
| 2005/0086212 A1 | 4/2005 | Hughes et al. | 707/3 |
| 2005/0108001 A1 | 5/2005 | Aarskog | 704/10 |
| 2005/0132070 A1 | 6/2005 | Redlich et al. | 709/228 |
| 2005/0154690 A1 | 7/2005 | Nitta et al. | 706/14 |
| 2005/0187866 A1 * | 8/2005 | Lee | 705/39 |
| 2005/0193029 A1 | 9/2005 | Rom et al. | 707/200 |
| 2005/0234894 A1 * | 10/2005 | Tenazas | 707/3 |
| 2005/0246358 A1 | 11/2005 | Gross | 707/100 |
| 2005/0257140 A1 * | 11/2005 | Marukawa | 715/513 |
| 2005/0267871 A1 | 12/2005 | Marchisio et al. | 707/3 |
| 2005/0283369 A1 | 12/2005 | Clausner et al. | 704/275 |
| 2005/0288920 A1 | 12/2005 | Green et al. | 704/3 |
| 2005/0289168 A1 | 12/2005 | Green et al. | 707/101 |
| 2006/0062470 A1 | 3/2006 | Zhu | 382/186 |
| 2006/0080338 A1 | 4/2006 | Seubert et al. | 707/100 |
| 2006/0136295 A1 | 6/2006 | Bobick et al. | 705/14 |
| 2006/0167931 A1 | 7/2006 | Bobick et al. | 707/102 |
| 2006/0242130 A1 | 10/2006 | Sadri et al. | 707/3 |
| 2007/0005566 A1 | 1/2007 | Bobick et al. | 707/2 |
| 2007/0174149 A1 | 7/2007 | Dinger et al. | 705/28 |
| 2007/0192319 A1 | 8/2007 | Finley et al. | 707/7 |
| 2008/0005651 A1 | 1/2008 | Grefenstette et al. | 715/500 |
| 2008/0021701 A1 | 1/2008 | Bobick et al. | 704/9 |

FOREIGN PATENT DOCUMENTS

| | | | | |
|---|---|---|---|---|
| JP | 10/124522 | 5/1998 | | G06F 17/30 |
| JP | 2000/112938 | 4/2000 | | G06F 17/27 |
| JP | 2003/228580 | 8/2003 | | G06F 17/30 |
| JP | 2004/021763 | 1/2004 | | G06F 17/30 |
| JP | 2005/258659 | 9/2005 | | G06F 17/30 |
| WO | 01/67280 | 9/2001 | | G06F 17/00 |
| WO | 03/056467 | 7/2003 | | G06F 17/30 |
| WO | 2006/053306 | 5/2006 | | G06F 17/00 |

OTHER PUBLICATIONS

U.S. Appl. No. 11/427,600, filed Jun. 2006, Bobick et al.

Andres et al. "Dynamic Topic Mapping Using Latent Semantic Indexing". Proceedings of the Third International Conference on Information Technology and Applications. ICITA 2005. IEEE, vol. 2, Jul. 4, 2005, pp. 220-225.

Almpanidis et al. "Focused Crawling Using Latent Semantic Indexing—An Application for Vertical Search Engines". Research and Advanced Technology for Digital Libraries Lecture Notes in Computer Science; LNCS, Springer, Berlin, DE, vol. 3652, Jan. 1, 2005, pp. 402-413.

Benjamin C. Hachey, "Recognising Clauses Using Symbolic and Machine Learning Approaches", University of Edinburgh, Sep. 2002, 94 pages.

Kelledy et al., "Automatic Phrase Recognition and Extraction from Text", Proceedings of the 19th Annual BCS-IRSG Colloquium on IR Research, 1997, 9 pages.

Chen, K., Topic Identification in Discourse, Morgan Kaufman, 1995, pp. 1-5.

"WebSphere Business Integration Adapter Framework". Found at http://www-01.ibm.com/software/integration/wbiadapters/framework, 2009, 1 page.

Joshua Bloch, "Trial:Collections". The Java™ Tutorial. Found at http://java.sun.com/docs/books/tutorial/collections. Copyright 1995-2005 Sun Microsystems, Inc., pp. 1-17.

"Python for NLP and the Natural Language Toolkit" CS1576: AI Application Development, (modified from Edward Loper's notes), Spring 2003. Found at http://www.cs.pitt.edu/~litman/courses/cs1573s03/lec/nltk.ppt, pp. 1-47.

Editor Dave Beckett. "RDF/XML Syntax Specification (Revised)", W3C Recommendation Feb. 10, 2004. Found at http://www.w3.org/TR/2004/REC-rdf-syntax-grammar-20040210/. Copyright 2004 W3C® (MIT,ERCIM,Keio), 1 page.

Lattner et al. "Automatic Pool Allocation for Disjoint Data Structures". ACM SIGPLAN Workshop on Memory System Performance (MSP2002), Jun. 16, 2002. Found at http://llvm.cs.uiuc.edu/pubs/2002-06-AutomaticPoolAllocation.ppt, pp. 1-21.

"Relational Database System Concepts" Penn Computing, Information Systems and Computing, University of Pennsylvania. Found at http://www.upenn.edu/computing/da/dw/concepts.html. Dec. 2001, pp. 1-3.

Ramakrishnan, "An Introduction to Java Map Collection Classes". Found at http://www.theserverside.com/news/thread.tss?thread_id=28777, Sep. 2004, pp. 1-6.

G. Veda, "Personal Information Systems", Dept. of Computer Science & Engineering, Indian Institute of Technology, Kanpur, UP, India—208016. Found at http://www.cse.iitk.ac.in/report-repository/2005/btp.pdf. May 2, 2005, pp. 1-12.

Eric W. Weisstein. "Acyclic Digraph", from MathWorld—A Wolfram Web Resource. © 1999-2005 Wolfram Research, Inc. Found at http://mathworld.wolfram.com/AcyclicDigraph.html, pp. 1-2.

"Directed Acyclic Graph", from Wikipedia. Found at http://en.wikipedia.org/wiki/Directed_acyclic_graph. Jun. 19, 2005, pp. 1-2.

"ICS 161: Design and Analysis of Algorithms—Lecture notes for Feb. 8, 1996". ICS 161—Dept. Information & Computer Science, UC Irvine. Found at http://www.ics.uci.edu/~eppstein/161/960208.html. May 2, 2000, pp. 1-4.

"Link Analysis: Why is it fundamental to search engine optimization?" Found at http://www.oyster-web.co.uk/link-analysis/link-analisys.html. © 2005 Indicium Web Design UK, pp. 1-4.

(56) References Cited

OTHER PUBLICATIONS

Ziv Bar-Yossef. "Algorithms for Large Data Sets". Lecture 3. Found at http://www.ee.technion.ac.il/courses/049011. Mar. 23, 2005, pp. 1-29.

"SVM Application List". Found at http://www.kernel-machines.org/links/isabelle-guyons-svm-application-list/. Jun. 20, 2005, pp. 1-21.

"Glossary of Graph Theory". Found at http://encyclopedia.laborlawtalk.com/Glossary_of_graph_theory, 2006, pp. 1-9.

"jmbox Project Home". Found at https://jmbox.dev.java.net/. © 2007 CollabNet, 1 page.

Eric W. Weisstein. "Web Graph", from MathWorld—A Wolfram Web Resource. Found at http://mathworld.wolfram.com/WebGraph.html. © 1999 CRC Press LLC, Wolfram Research, Inc, © 1999-2005 Wolfram Research, Inc., pp. 1-2.

\* cited by examiner

NODE IMPLEMENTATIONS

NODE 180A

| SUBJECT 182 (FIRST RELATUM) | BOND 184 (RELATION) | ATTRIBUTE 186 (SECOND RELATUM) |
|---|---|---|

EX: "GOLD" "IS" "STANDARD"

NODE 180B

| SUBJECT 182 (FIRST RELATUM) | BOND 184 (RELATION) | ATTRIBUTE 186 (SECOND RELATUM) | SEQUENCE 188 (SOURCE) |
|---|---|---|---|

EX: "ACTION" "REGARDING" "INFLATION" "WWW.WMHODGES/ HOME.ATT.NET/ INFLATION.HTM"

EXY - STEP 3: RANKXY REPORT

FILE   OPTIONS   HELP

RANKXY REPORT:

TOTAL SITE COUNT = 71 FOR GOLD INFLATION >>>

| RANK | CONTRIBUTING SITE | USE COUNT |
|---|---|---|
| 1 | http://www.abeland.org/inflation.htm | 9572 |
| 2 | http://www.wmhodges/home.att.net/inflation.htm | 7629 |
| 3 | http://www.goldcopd.com | 5084 |
| 4 | http://en.wikipedia.org/wiki/inflation | 4925 |
| 5 | http://airnow.gov | 2888 |
| 6 | http://en.wikipedia.org/wiki/terrorism | 2567 |
| 7 | http://www.darksky.org/ | 2061 |
| 8 | http://cfrterrorism.org/home/ | 1515 |
| 9 | http://oregonstate.edu/depot/pol_sci/fac/sahr.htm | 1514 |
| 10 | http://www.terror.gen.tr/english/ | 1471 |
| 11 | http://en.wikipedia.org/wiki/pollution | 899 |
| 12 | http://www.lifesci.sussex.ac.uk/home/john_gribbin/cosmo.htm | 847 |
| 13 | http://www.gold-eagle.com/ | 811 |
| 14 | http://www.umich.edu/~ge265/society/waterpolution.htm | 631 |
| 15 | http://www.state.gov/s/ct/ | 336 |
| 16 | http://en.wikipedia.org/wiki/gold | 275 |
| 17 | http://www.bankofcanada.ca/en/rates/inflation_calc.html | 220 |
| 18 | http://www.mipt.org/ | 177 |
| 19 | http://www.worldbank.org/nipr/ | 140 |

FIG. 2E

TECHNIQUES FOR KNOWLEDGE DISCOVERY BY CONSTRUCTING KNOWLEDGE CORRELATIONS USING CONCEPTS OR TERMS

CROSS REFERENCE TO RELATED APPLICATIONS

This application is a continuation of Pending Ser. No. 11/273,568 filed Nov. 14, 2005, which claims priority to provisional application Ser. No. 60/627,772, filed on Nov. 12, 2004, Ser. No. 60/637,935, filed on Dec. 21, 2004, and Ser. No. 60/694,331, filed on Jun. 27, 2005, all of which are hereby incorporated herein in their entireties by reference.

A portion of the disclosure of this patent document contains material that is subject to copyright protection. The copyright owner has no objection to the facsimile reproduction by anyone of the patent document or the patent disclosure as it appears in Patent and Trademark Office patent file records, but otherwise reserves all copyright rights whatsoever.

REFERENCE TO PROGRAM SEQUENCE LISTING (CD-ROM)

This application contains a computer program listing on CD-ROM that is hereby incorporated by reference in to the specification of this application in its entirety.

BACKGROUND OF THE INVENTION

1. Field of the Invention

The invention is directed to the field of information technology and more particularly to techniques for knowledge discovery by constructing knowledge correlations using concepts or terms.

2. Description of the Prior Art

A number of searching techniques are know in the prior art for identifying information about various terms. These include search engines, search robots and the like. Typically, a search engine indexes each term of a body of text as to location so that when a query term is submitted, the locations of those terms can be identified. The results of a search engine search can be combined using Boolean logic with the results of searches of other terms to more specifically focus the results to those that are desired.

BRIEF SUMMARY OF THE INVENTION

The 1979 Websters New Collegiate Dictionary contains the following definitions of knowledge:
Knowledge . . .
(a) . . . (2) the fact or condition of knowing something with familiarity gained through experience or association;
(b) . . . (2) the range of one's information or understanding.

The invention describes techniques for identifying knowledge related to individual or groups of terms. A user inputs one or more terms to be explored for additional knowledge. A search is then undertaken across sources of information that contain resources having information about or information associated with the input terms. When such a resource is found, the information it contains is decomposed into nodes, which are a particular data structure that stores elemental units of information. Resulting nodes are stored in a node pool. The node pool is then used to construct chains of nodes or correlations that link the nodes into a knowledge bridge that documents the resulting information about or information associated with the terms being explored.

Knowledge is acquired in accordance with the invention by expanding the range of one's information and understanding about information linkages that might not otherwise be apparent. This knowledge is expressed in a formal way by linking nodes into a correlation.

BRIEF DESCRIPTION OF THE DRAWINGS

FIG. 1C: is a block diagram of Nodes in three parts and four parts.

FIG. 2D: illustrates the GUI component that enables a user to save to disk.

FIG. 2E: illustrates the GUI "RankXY" report which provides a relevancy measure for all resources discovered in the Search phases of processing.

DETAILED DESCRIPTION

Figure 1A:
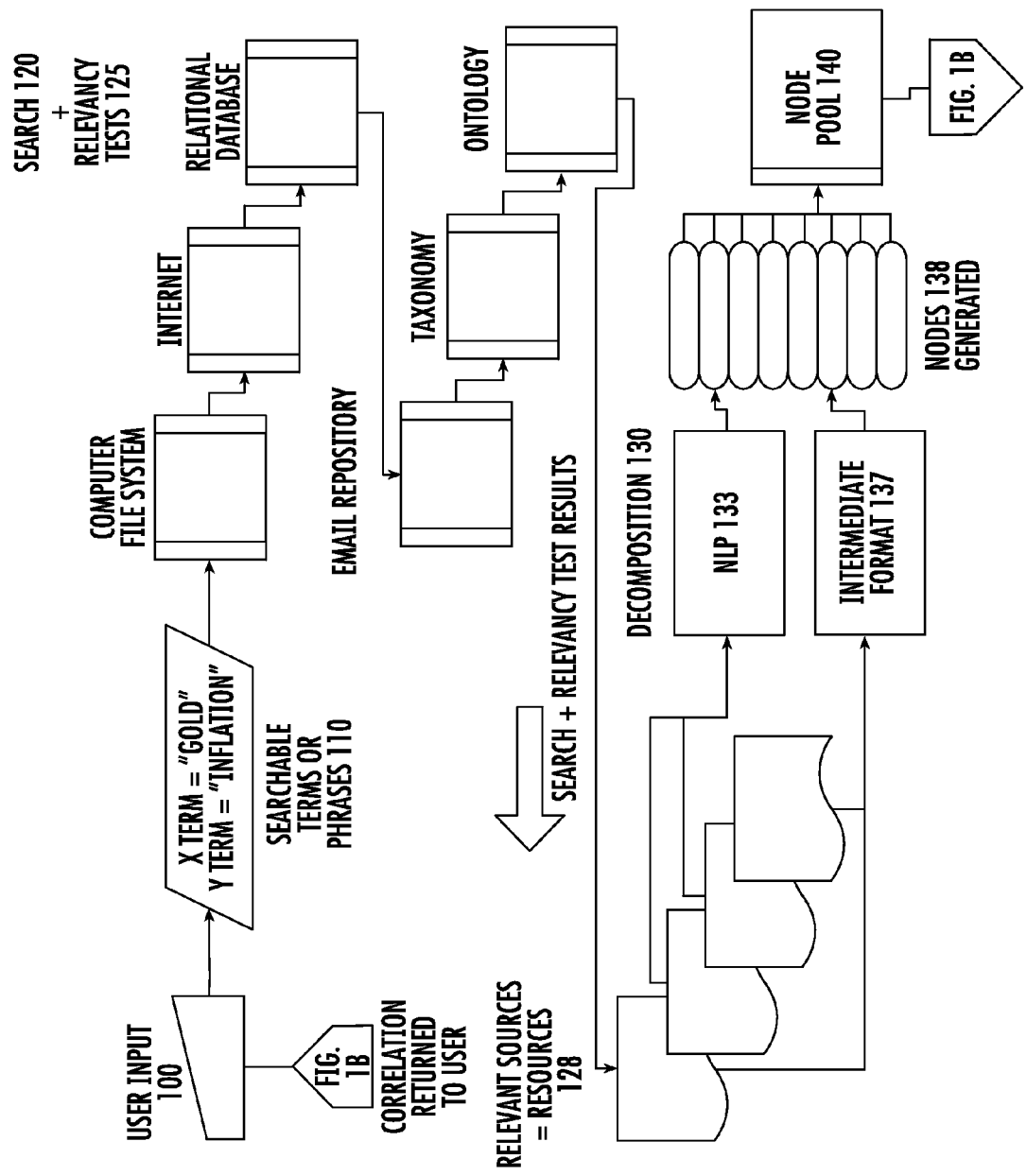
FIG. 1A: is a flow chart diagram illustrating the user input, Discovery, and Acquisition phases of the current invention.
Figure 1B:
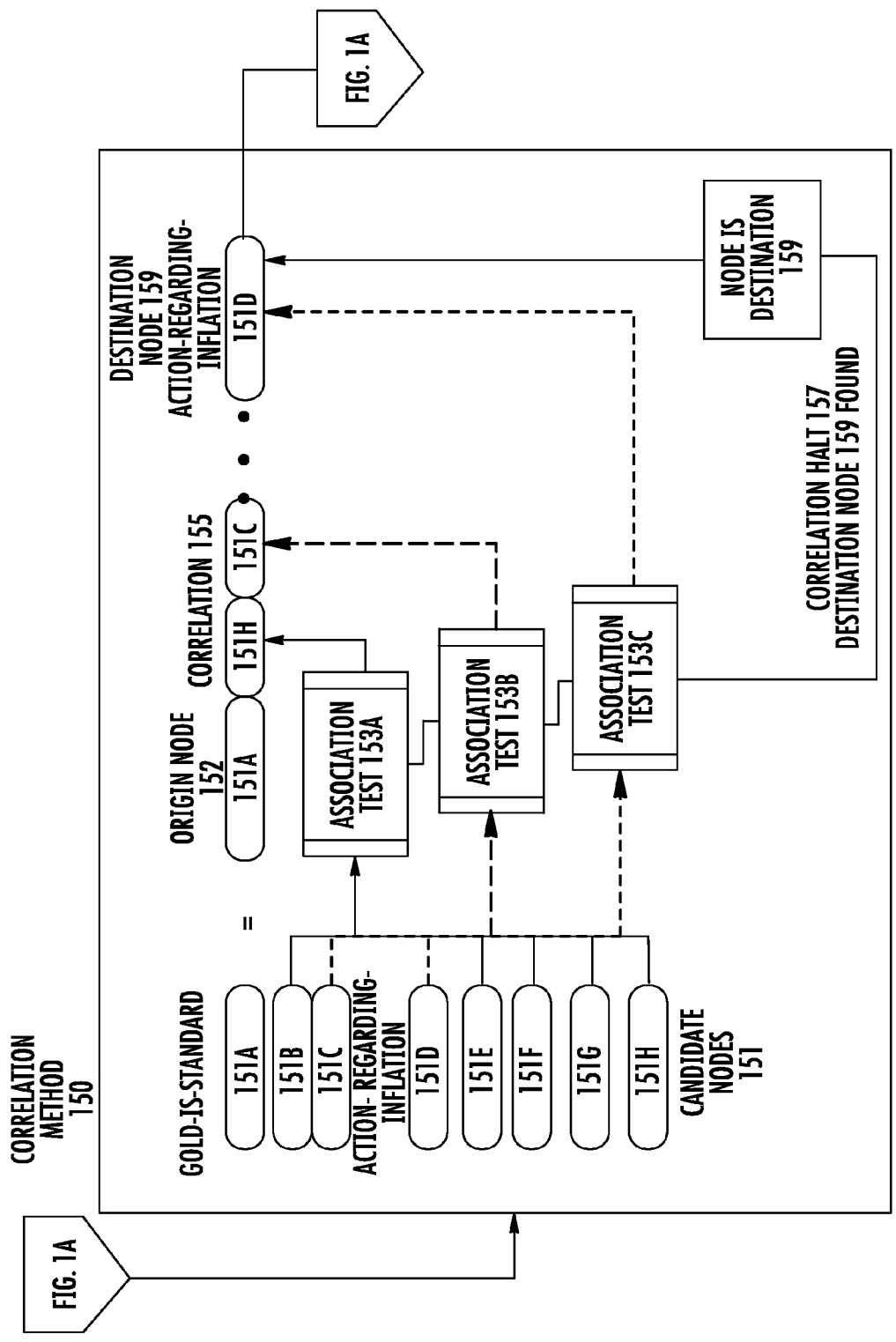
FIG. 1B: is a flowchart diagram illustrating the method of correlation.

FIGS. 1A and 1B are flow charts of a process for constructing knowledge correlations in accordance with the preferred embodiment of the invention. FIGS. 2A-2E are screen captures of the GUI for the current invention.

Figure 2A:
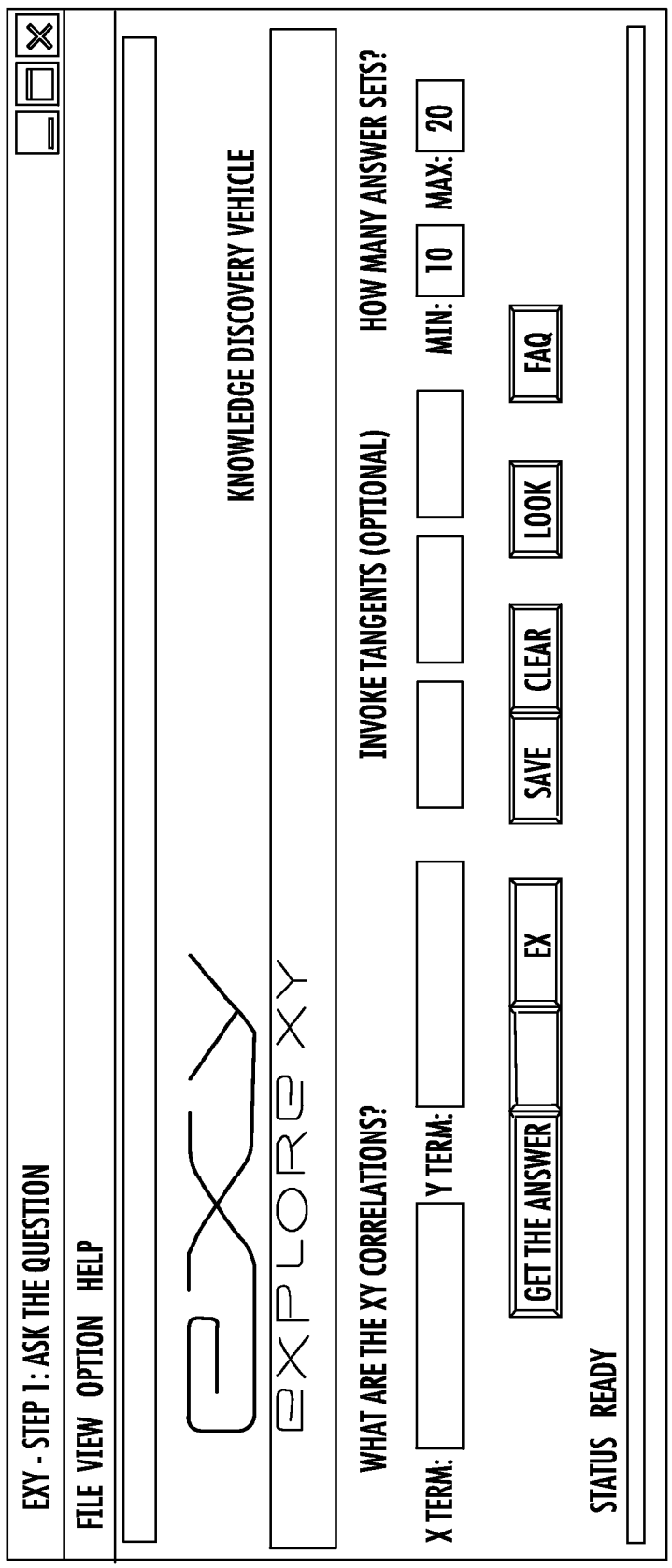
FIG. 2A: is a screen capture of the initial user-facing GUI component, which illustrates the fields of interest for correlation.

In an example embodiment of the present invention as represented in FIG. 1A, a user enters at least one term via using a GUI interface. FIG. 2A is a screen capture of the GUI component intended to accept user input. Significant fields in the interface are "X Term", "Y Term" and "Tangents". As described more hereinafter, the user's entry of between one and five terms or phrases has a significant effect on the behavior of the present invention. In a preferred embodiment as shown in FIG. 2A, the user is required to provide at least two input terms or phrases. Referring to FIG. 1A, the user input 100, "GOLD" is captured as a searchable term or phrase 110, by being entered into the "X Term" data entry field of FIG. 2A. The user input 100 "INFLATION" is captured as a searchable term or phrase 110 by being entered into the "Y Term" data entry field of FIG. 2A. Once initiated by the user, a search 120 is undertaken to identify actual and potential sources for information about the term or phrase of interest. Each actual and potential source is tested for relevancy 125 to the term or phrase of interest. Among the sources searched are computer file systems, the Internet, Relational Databases, email repositories, instances of taxonomy, and instances of ontology. Those sources found relevant are called resources 128. The search 120 for relevant resources 128 is called "Discovery". The information from each resource 128 is decomposed 130 into digital information objects 138 called nodes. Referring to FIG. 1C, nodes 180A and 180B are data structures which contain and convey meaning. Each node is self contained. A node requires nothing else to convey meaning. Referring once again to FIG. 1A, nodes 180A, 180B from resources 128 that are successfully decomposed 130 are placed into a node pool 140. The node pool 140 is a logical structure for data access and retrieval. The capture and decomposition of resources 128 into nodes 180A, 180B is called "Acquisition". A correlation 155 is then constructed using the nodes 180A, 180B in the node pool 140, called member nodes. Referring to FIG. 1B, the correlation is started from one of the nodes in the node pool that explicitly contains the term or phrase of interest. Such a node is called a term-node. When used as the first node in a correlation, the term-node is called the origin 152 (source). The correlation is constructed in the form of a chain (path) of nodes. The path begins at the origin node 152 (synonymously referred to as path root). The path is extended by searching among node members 151 of the node pool 140 for a member node 151 that can be associated with the origin node 152. If such a node (qualified member 151H) is found, that qualified member node is chained to the origin node 152, and designated as the current terminus of the path. The path is further extended by means of the iterative association with and successive chaining of qualified member nodes of the node pool to the successively designated current terminus of the path until the qualified member node associated with and added to the current terminus of the path is deemed the final terminus node (destination node 159), or until there are no further qualified member nodes in the node pool. The association and chaining of the destination node 159 as the final terminus of the path is called a success outcome (goal state), in which case the path is thereafter referred to as a correlation 155, and such correlation 155 is preserved. The condition of there being no further qualified member nodes in the node pool, and therefore no acceptable destination node, is deemed a failure outcome (exhaustion), and the path is discarded, and is not referred to as a correlation. A completed correlation 155 associates the origin node 152 with each of the other nodes in the correlation, and in particular with the destination node 159 of the correlation. The name for this process is "Correlation". The correlation 155 thereby forms a knowledge bridge that spans and ties together information from all sources identified in the search. The knowledge bridge is discovered knowledge.

Figure 2B:
FIG. 2B: is a screen capture of the GUI component "Ask the Question" at the moment all three stages of "Discovery", "Acquisition", and "Correlation" have completed.

Referring to FIG. 2B, showing the GUI component "Ask the Question" at the moment all three stages of "Discovery", "Acquisition", and "Correlation" have completed. In the present invention, progress indicators for each stage of processing are provided.

Figure 2C:
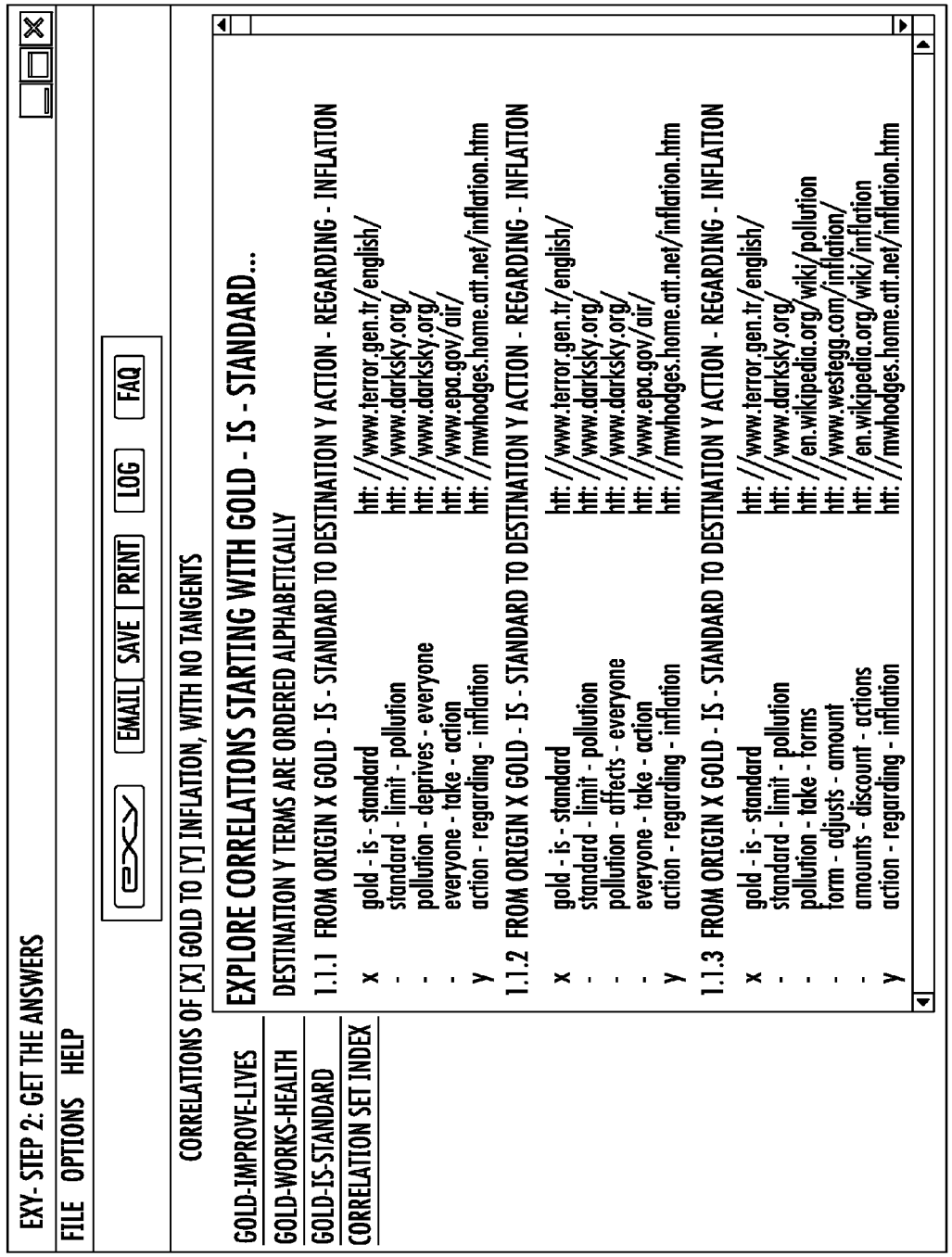
FIG. 2C: illustrates correlations that have been found in the example embodiment of the invention, and are displayed in a tabbed-pane format. This is called the "Get The Answers" page.
Figure 3A:
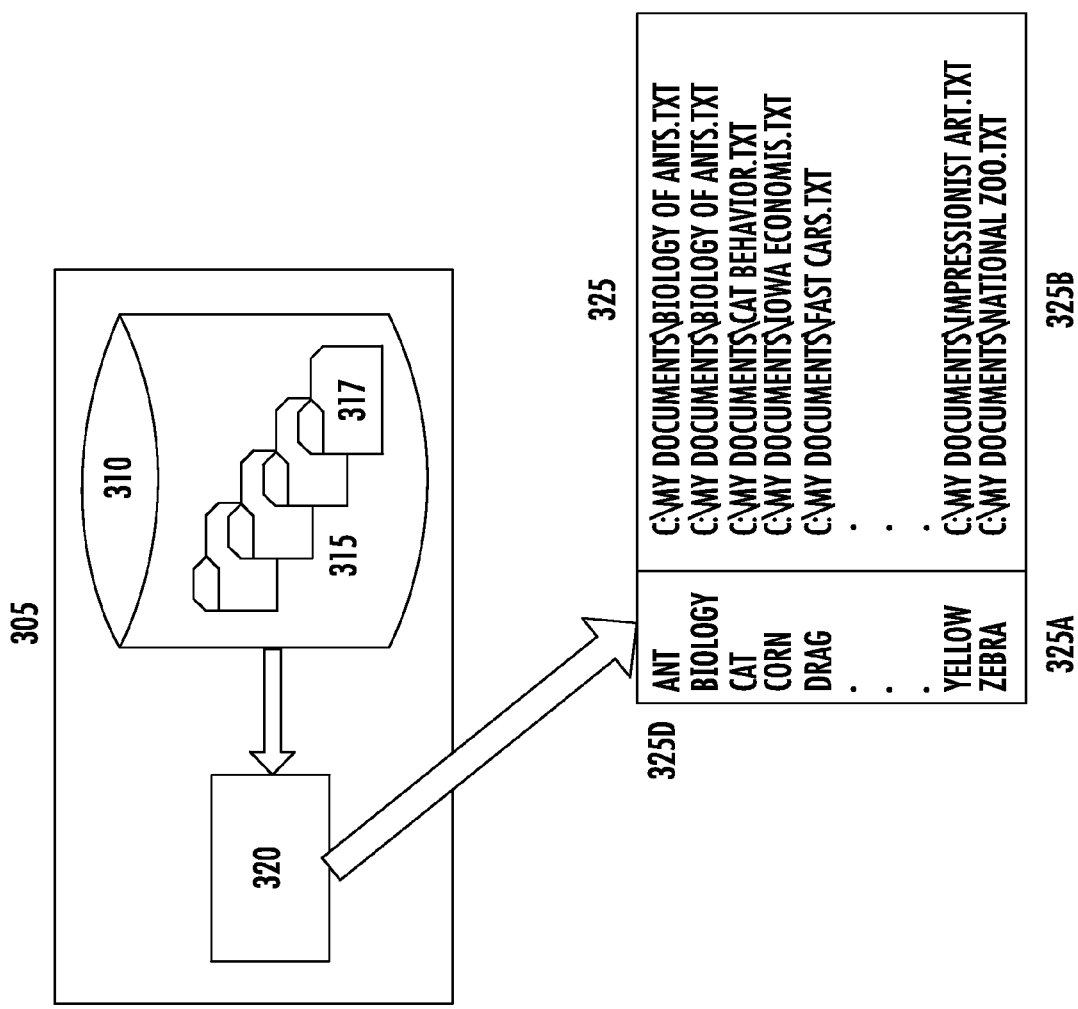
FIG. 3A: illustrates an index type searchengine.

Referring to FIG. 2C, correlations have been found in the example embodiment of the invention, and are displayed in a tabbed-pane format. The tabs to the left of the screen are the origins 152 which have been successfully correlated to the destinations nodes 159 shown on the right side of the screen. Each successful correlation 155 is individually displayed.

Figure 2D:
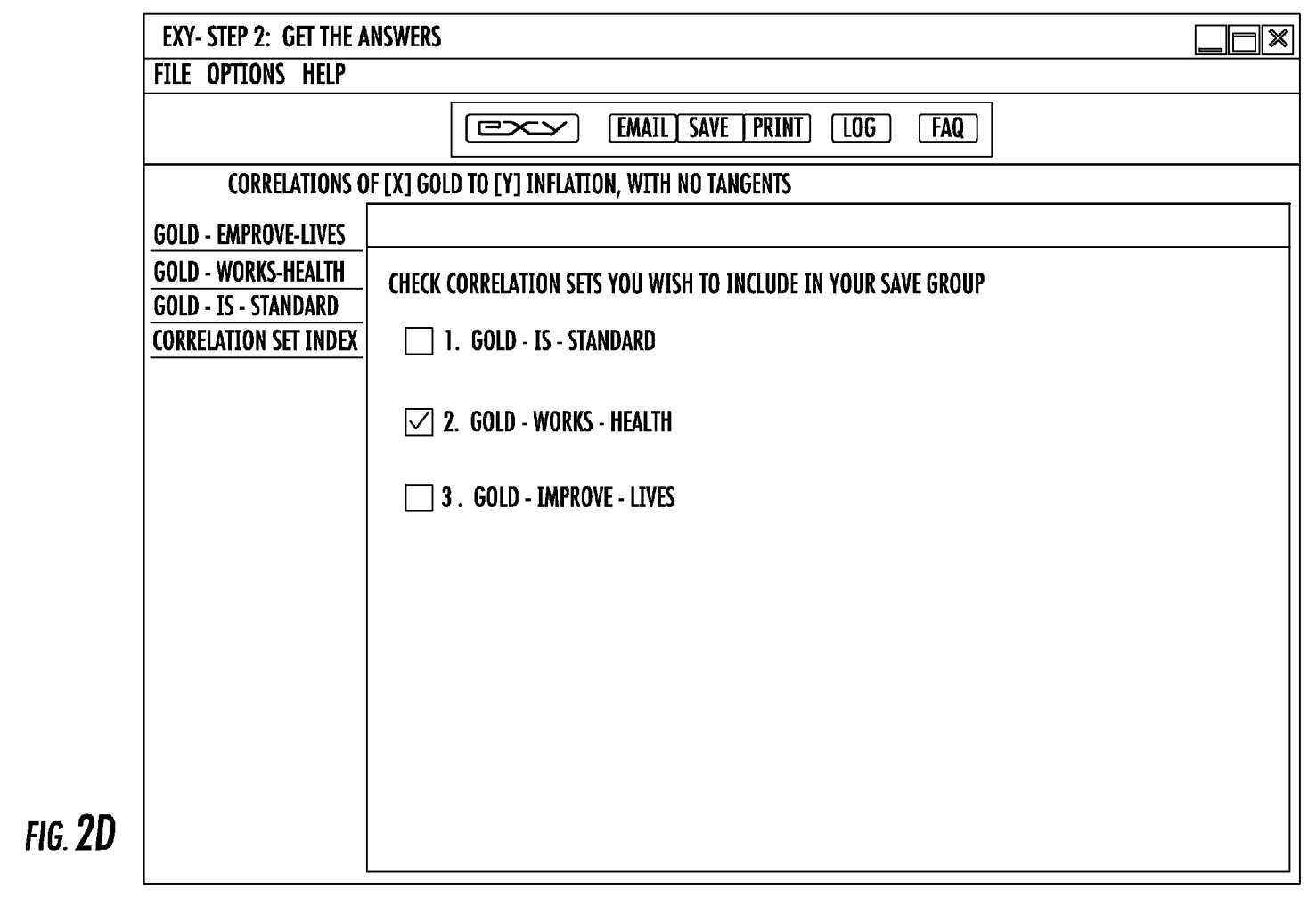

Referring to FIG. 2D, the user is able, in the current invention to persist to disk any correlations of particular merit. APPENDIX A: Report contains the full report generated by this execution of the current invention.

Referring to FIG. 2E, an additional report "RankXY" is provided to advise the user which resources 128 were the most significant contributors to the correlations 155 that were created in this execution of the present invention.

Users can input from one to five terms in one preferred embodiment, and the number of terms input will dictate or affect the type of knowledge correlations that can be produced as well as the "quality" as described more hereinafter of the correlations that can be produced. Terms can be one word or phrases of two words. There are two correlation types supported by the present invention:

1. "free association", where, when given only a single term input by the user, a number of origins in the form of nodes will be developed from that term, and the present invention will attempt to build a knowledge bridge from each origin to each and every of whatever number of potential destinations as can be found in the form of destination nodes. The destinations are selected in at least two "halt correlation" scenarios as more described hereinafter. In this type of correlation, the destination is not known a priori, and the benefit sought by the user is first, the unexpected and novel associations of the origin with facts, ideas, concepts, or simply terms named or suggested by the destinations, with a second benefit in that the path of association from origin to destination suggests novel or innovative solutions, unexpected influences, and previously unconsidered aspects on a problem or topic.
2. "connect the dots", where, when given two terms input by the user, a number of origins will be developed from that first term and a number of destinations will be developed from that second term, and the present invention will attempt to build a knowledge bridge from each and every origin to each and every destination. The correlation action is only considered a success if at least one origin can be linked by a chain of association to at least one destination. The benefit sought by the user in this instance is first in establishing that association from origin to destination, thereby solving a "there exists" assertion, and as with all correlations, the knowledge and insight imparted from the path of association from origin to destination as manifested in a knowledge correlation.

When a third, fourth, or fifth term is input by a user, the benefit sought is to enrich or shape the "search space" in the form of a node pool that is the well from which nodes are drawn and correlations are constructed. In a preferred embodiment of the present invention, the third, fourth, and fifth concept or term, when provided, provides a minimum benefit in that the capture of additional resources increases the size and heterogeneity of the node pool as search space, and thereby increases the potential for successful correlation using any given origin. In a preferred use of the invention, the resources captured as a result of providing a third, fourth and/or fifth term orthogonally extend the node pool as search space and knowledge domain. For example, given an origin of "energy consumption", and a destination of "rap music", a third, fourth and fifth input of "electronics", "copyright", and "culture" would bring into the node pool information that might be expected to produce novel resulting correlations. In this preferred use, this extension is called enrichment, and the third, fourth and fifth terms are called tangents. In another preferred use of the invention, providing well chosen third, fourth and fifth terms permits the node pool as search space and knowledge domain to be defined using Cartesian dimensions of topicality or semantics, juxtaposed with the search space and knowledge domain generated from use of the first and/or second terms. For example, given the origin "communications industry", and the destination "future profitability", a third, fourth and fifth input of "economics", "politics" and "regulation" would bring into the node pool information that might be expected to effectively encompass all material aspects with bearing on the question. Successful correlations are possible even if there exists no union, intersection, or characteristic of adjacency between the search spaces and knowledge domains created in the node pool.

For each term input by the user that is, for the first, second, third, fourth and fifth term or phrase of interest, an independent search is conducted for sources of information on that term or phrase. This involves traversing (searching) one or more of
- (i) computer file systems
- (ii) computer networks including the Internet
- (iii) email repositories
- (iv) relational databases
- (v) taxonomies
- (vi) ontologies in short, any repository of information that a computer can access.

The search differs for each type of repository. In one embodiment directed to searching one or more computer file systems, search is conducted by navigating the file system directory. The file system directory is a hierarchical structure used to locate all sub-directories and files in a computer file system. The file system directory is constructed and represented as a tree, which is a type of graph, where the vertices (nodes) of the graph are sub-directories or files, and the edges of the graph are the paths from the directory root to every sub-directory or file. Computers that may be searched in this way include individual personal computers, individual computers on a network, network server computers, and network file server computers. Network file servers are special typically high performance computers which are dedicated to the task of supporting file persistence and retrieval functions for a large group of users.

Computer file systems may hold actual and potential sources for information about the term or phrase of interest which are stored as
- (i) text (plain text) files.
- (ii) Rich Text Format (RTF) (a standard developed by Microsoft, Inc.) files.
- (iii) Extended Markup Language (XML) (a project of the World Wide Web Consortium) files.
- (iv) any dialect of markup language files, including, but not limited to: HyperText Markup Language (HTML) and Extensible HyperText Markup Language (XHTML™) (projects of the World Wide Web Consortium), RuleML (a project of the RuleML Initiative), Standard Generalized Markup Language (SGML) (an international standard), and Extensible Stylesheet Language (XSL) (a project of the World Wide Web Consortium).
- (v) Portable Document Format (PDF) (a proprietary format of Adobe, Inc.) files.
- (vi) spreadsheet files e.g. XLS files used to store data by Excel (a spreadsheet software product of Microsoft, Inc.).
- (vii) MS WORD files e.g. DOC files used to store documents by MS WORD (a word processing software product of Microsoft, Inc.).
- (viii) presentation (slide) files e.g. PPT files used to store data by PowerPoint (a slide show studio software product of Microsoft, Inc.)
- (ix) event-information capture log files, including, but not limited to: transaction logs, telephone call records, employee timesheets, and computer system event logs.

When searching computer file systems, software robots sometimes called spiders (e.g. Google Desktop Crawler, a product of Google, Inc.), or search bots can be dispatched to identify actual and potential sources for information about the term or phrase of interest. Spiders and robots are software programs that follow links in any graph-like structure such as a file system directory to travel from directory to directory and file to file. The method includes the steps of (a) providing the term or phrase of interest to the robot; (b) providing a starting point on the file system directory for the robot to begin the search (usually the root); (c) at each potential source visited by the robot, the robot performing a relevancy test, discussed more hereinafter; (d) if the source is relevant, the robot will create or capture a URI (Uniform Resource Identifier) or URL (Uniform Resource Locator) of the source, which is then considered a resource; and (e) the robot returning to the method which dispatched the robot, the robot delivering the captured URI or URL of the resource to the dispatching method.

In an alternative embodiment, preferred for some uses, the robot designates itself a first robot, and as the first robot clones a copy of itself, thereby creating an additional, independent, clone robot. The first robot endows the clone robot with the URI or URI of the relevant resource and directs the clone robot to return to the method which dispatched the first robot. The clone robot delivers the captured URI or URL of the resource to the dispatching method, while the first robot moves on to capture additional URIs and URLs. Information specific to the relevant source in addition to the URI or URL of the relevant source can be captured by the robot, including a detailed report on the basis and outcome of the relevancy test used by the robot to select the relevant resource, the size in bytes of the relevant source, and the format of the relevant source content.

Where the intent is to search the Internet, a web crawler robot (e.g. JSpider, a project of JavaCoding.com) may be used. Such a robot follows links on the Internet to travel from web site to web site and web page to web page. In one embodiment, the present invention will search the World Wide Web (Internet) to identify actual and potential sources for information about the term or phrase of interest which are published as web pages, including:
- (i) text (plain text) files.
- (ii) Rich Text Format (RTF) (a standard developed by Microsoft, Inc.) files.
- (iii) Extended Markup Language (XML) (a project of the World Wide Web Consortium) files.
- (iv) any dialect of markup language files, including, but not limited to: HyperText Markup Language (HTML) and Extensible HyperText Markup Language (XHTML™) (projects of the World Wide Web Consortium), RuleML (a project of the RuleML Initiative), Standard Generalized Markup Language (SGML) (an international standard), and Extensible Stylesheet Language (XSL) (a project of the World Wide Web Consortium).
- (v) Portable Document Format (PDF) (a proprietary format of Adobe, Inc.) files.
- (vi) spreadsheet files e.g. XLS files used to store data by Excel (a spreadsheet software product of Microsoft, Inc.).
- (vii) MS WORD files e.g. DOC files used to store documents by MS WORD (a word processing software product of Microsoft, Inc.).
- (viii) presentation (slide) files e.g. PPT files used to store data by PowerPoint (a slide show studio software product of Microsoft, Inc.)
- (ix) event-information capture log files, including, but not limited to: transaction logs, telephone call records, employee timesheets, and computer system event logs.
- (x) blog pages;

Search engines are a preferred alternative used in the present invention to identify actual and potential sources for information about the term or phrase of interest. Search engines are server-based software products which use specific, sometimes proprietary means to identify web pages relevant to a user's query. The search engine typically returns to the user a list of HTML links to the identified web pages. In this embodiment of the present invention, a search engine is invoked programmatically. The term or phrase of interest is programmatically entered as input to the search engine software. The list of HTML links returned by the search engine provides a pre-qualified list of web pages that are considered actual sources of information about the term or phrase of interest.

One type of search engine is limited to the function of an index engine. An index engine is server-based software that searches the Internet, and every web page found is decomposed into individual words or phrases. On the servers for the index engine, a database of words called the index is maintained. Words discovered on a web page that are not in the index are added to the index. For each word or phrase on the index, a list of web pages where the word or phrase can be found is associated with the word or phrase. The word or phrase acts as a key, and the list of web pages where the word can be found is the set of values associated with the key. The list of HTML links returned by the index engine provides a list of web pages which may be considered actual sources of information (resources) about the term or phrase of interest. The occurrence of a term or phrase of interest in a web page is the least reliable relevancy test. An additional relevancy test applied to each source is highly preferred.

For example, an index engine can be combined with a spider, where the search engine dispatches one or more spiders to one or more of the web pages associated in the index database with each term or concept of interest. The spider applies a more robust relevancy test described more hereinafter to each web page. HTML links to those web pages found relevant by the spider are returned and are considered actual sources of information (resources) about the term or phrase of interest.

An improved implementation of a search engine utilizes all terms or phrases of interest together as a query. When submitted to the search engine, the search engine captures the query and persists the query in a database index. The index for queries is maintained by the search engine as an additional index. When a web page found relevant by the robot is reported to the search engine, the search engine not only reports the HTML link to the web page, but uses the entire query as a key and stores the HTML link to the relevant web page as a value associated with the query. HTML links to all pages found relevant to the query are captured, and associated with the query in the search engine database. When a subsequent query is received by the search engine, and that query exactly or approximately matches a query already present in the search engine query index, the search engine will return the list of HTML links associated with the query in the query database. The improved search engine can return immediate results and will not have to dispatch a robot to subject any web page to a relevancy test.

Another useful form of search engine is a meta-crawler. Meta-crawlers are server-based software products which use proprietary means to identify web pages relevant to a user's query. The meta-crawler typically programmatically invokes multiple search engines, and retrieves the lists of HTML links to web pages identified as relevant by each search engine. The meta-crawler then applies specific, sometimes proprietary means to compute scores for relevancy for individual web pages based upon the explicit or implicit relevancy score of each page as determined by a contributing search engine. The meta-crawler then typically returns to the user a list of HTML links to the most relevant web pages, ranked in order of relevancy. In one embodiment, the meta-crawler is invoked programmatically. The term or phrase of interest is programmatically entered as input to the meta-crawler software. The meta-crawler software in turn programmatically enters the term or phrase of interest to each search engine the meta-crawler invokes. The list of links returned by the meta-crawler provides a pre-qualified list of web pages which are considered actual sources of information about the term or phrase of interest.

Large amounts of significant unstructured data is stored in email repositories located on individual personal computers, on each individual computer on a network, on network server computers, and on network email server computers. Network email servers are special typically high performance computers which are dedicated to the task of supporting email functions for a large group of users. In constructing knowledge correlations, it is desirable, in accordance with one aspect of the invention, to locate email messages and email attachments relevant to a term or phrase of interest.

Email repositories are typically encapsulated and accessed through email management software called email server software or email client software, with the server software designed to support multiple users and the client software designed to support individual users on personal computers and laptops. One embodiment of the present invention uses JavaMail (Sun Microsystems email client API) along with a Local Store Provider for JavaMail such as jmbox, a project of https://jmbox.dev.java.net/ to programmatically access and search the email messages stored in local repositories like Outlook Express (a product of Microsoft, Inc), Mozilla product of mozilla, org), Netscape (a product of Netscape), etc. In this embodiment, the accessed email messages are searched as text for terms or phrases of interest using Java String comparison functions.

An alternative embodiment, preferred for some uses, utilizes an email parser. In this embodiment, the email headers are stripped off and the from, to, subject, and message fields of the email are searched for the term or phrase of interest. Email parsers of this type are part of the UNIX operating system (procmail package), as well as numerous software libraries.

Repositories on email servers are often in proprietary form, but some provide an API that will permit programmatic access to and searching of email messages. One example of such an email server is Apache. James (a product of Apache.org). Another example is the Oracle email Server API (a product of Oracle, Inc). Email messages accessed via the email server repository management software API that are found to contain terms or phrases of interest are considered resources.

With programmatic access to the email messages, most embodiments of the invention will have access to the email message attachments. Where the attachments exist in proprietary formats, a parsing utility such as a
  (i) PDF-to-text conversion utility (e.g. PJ, a product of Etymon Systems, Inc.)
  (ii) RTF-to-text conversion utility (e.g. RTF-Parser-1.09, a product of Pete Sergeant)
  (iii) MS Word-to-text parser (e.g. the Apache POI project, a product of Apache.org)
can be linked in and invoked to render the attachment into a searchable form. For email servers that provide APIs, some further incorporate native format search utilities for attachments. Email messages and email attachments can exist in numerous file formats, including:
  (i) text (plain text) file email attachments.
  (ii) Extended Markup Language (XML) file email attachments.

(iii) any dialect of markup language, including, but not limited to: HyperText Markup Language (HTML) and Extensible HyperText Markup Language (XHTML™ (projects of the World Wide Web Consortium), RuleML (a project of the RuleML Initiative), Standard Generalized Markup Language (SGML) (an international standard), and Extensible Stylesheet Language (XSL) (a project of the World Wide Web Consortium) file email attachments.

(iv) Portable Document Format (PDF) (a proprietary format of Adobe, Inc.) file email attachments.

(v) Rich Text Format (RTF) (a standard developed by Microsoft, Inc.) file email attachments.

(vi) spreadsheet file email attachments e.g. XLS used to store data by Excel (a spreadsheet software product of Microsoft, Inc.).

(vii) MS DOC file email attachments e.g. DOC files used to store documents by MS WORD (a word processing software product of Microsoft, Inc.)

(viii) event-information capture log file email attachments, including, but not limited to: transaction logs, telephone call records, employee timesheets, and computer system event logs.

Relational databases (RDB) are well known means of storing and retrieving data, based upon the relational algebra invented by Codd and Date. Relational databases are typically implemented using indexes, tables and views, with an index containing data keys, tables composed of columns and rows or tuples of data values, and views acting as virtual tables so that specific columns and rows of multiple tables can be manipulated as if those columns and rows of data were integrated in an actual physical table. The arrangement of tables and columns implements a logical structure for referencing data and that logical structure is called a schema. A software layer called a Relational Database Management System (RDBMS) is typically used to handle access, security, error handling, integrity, table creation and removal, and all other functionality required for proper operation and utilization of the RDB. In addition, the RDBMS typically provides an interface between the RDB and external software programs and/or users. Each active instance of the interface between the RDBMS and external software programs and/or users is called a connection. The RDBMS provisions two special languages for use between the RDBMS and connected external software programs and/or users. The first language, a Data Definition Language (DDL) allows external software programs and users to review and manage the components and structure of the database, and permits functions like creation, deletion, and modifications of indexes, tables and views. The schema can only be modified using DDL. Another language, a Query Language called a Data Manipulation Language (DML) permits selection, retrieval, sorting, insertion, and deletion of the rows of data values contained in the database tables. The most commonly known DDL and DML for relational databases is Structured Query Language (SQL) (an ANSI/ISO standard). SQL statements are composed by software programs and/or users connected to the RDBMS and submitted as a query. The RDBMS processes a query and returns an answer called a result set. The result set is the set of rows and columns in the database which match (satisfy) the query. If no rows and columns in the database satisfy the query, no rows and columns are returned from the query, in which case the result set is called empty (NULL SET). In an example embodiment of the present invention, the potential or actual sources for information about the term or phrase of interest are the rows of data in a table in the RDB. Each row in an RDB table is considered to be equally eligible to become a source of information about the term or phrase of interest. The method includes the steps of (a) creating a connection to the database;
(b) forming a query in SQL which
    (b1) includes a SQL WHERE clause,
    (b2) the WHERE clause names at least one table in the RDB
    (b3) the WHERE clause names at least one column in the database table, and
    (b4) the WHERE clause contains at least one SQL comparison operator such as EQUALS, and
    (b5) the WHERE clause contains at least one term or phrase of interest as a parameter;
(c) submitting the query to the RDBMS;
(d) accepting the rows of data (if any) returned by the RDBMS which are considered actual sources of information about the term or phrase of interest.

Where the number of columns in the database table to be searched is greater than one, the method includes the steps of (a) creating a connection to the database;
(b) forming a query in SQL which
    (b1) includes a SQL WHERE clause,
    (b2) the WHERE clause names at least one table in the RDB
    (b3) the WHERE clause names one column in the database table, and
    (b4) the WHERE clause contains at least one SQL comparison operator such as EQUALS, and
    (b5) the WHERE clause contains at least one term or phrase of interest as a parameter, and
    (b6) and for each column in the table to be searched, an additional WHERE clause is composed of (b1), (b2), (b3) where each column to be searched is individually identified, (b4), and (b5), and
    (b7) each additional WHERE clause is conjoined by the SQL 'OR' operator;
(c) submitting the query to the RDBMS;
(d) accepting the rows of data (if any) returned by the RDBMS which are considered actual sources of information about the term or phrase of interest.

Where the number of database tables to be searched is greater than one, the method includes the steps of (a) creating a connection to the database;
(b) forming a query in SQL which
    (b1) includes a SQL WHERE clause,
    (b2) the WHERE clause names one table in the RDB
    (b3) the WHERE clause names at least one column in the database table, and
    (b4) the WHERE clause contains at least one SQL comparison operator such as EQUALS, and
    (b5) the WHERE clause contains at least one term or phrase of interest as a parameter, and
    (b8) and for each table to be searched, an additional WHERE clause is composed of (b1), (b2) where each table to be searched is individually identified, (b3), (b4), and (b5), and
    (b7) the additional WHERE clauses are conjoined by the SQL OR operator;
(c) submitting the query to the RDBMS;
(d) accepting the rows of data (if any) returned by the RDBMS which are considered actual sources of information about the term or phrase of interest.

In these embodiments, any rows of data returned from the query are considered resources of information about the term or phrase of interest. The schema of the relational database resource is also considered an actual source of interest about the term or phrase of interest. Relational Databases preferred for some uses of the current invention are deployed on individual personal computers, each computer on a computer network, network server computers and network database server computers. Network database servers are special typically high performance computers which are dedicated to the task of supporting database functions for a large group of users.

Database views can be accessed for reading and result-set retrieval using essentially the same procedure as for actual database tables by means of the WHERE clause naming a database view, instead of a database table. Another embodiment uses SQL to access and search a data warehouse to identify actual and potential sources for information about the term or phrase of interest. Data warehouses are special forms of relational databases. SQL is used as the DML and DDL for most data warehouses, but data in data warehouses is indexed by a complex and comprehensive index structure.

Taxonomy was first used for the classification of living organisms. Taxonomy is the science of classification, but an instance of a taxonomy is a catalog used to provide a framework for discussion, analysis, or information retrieval. A taxonomy is created by the classification of things into an unambiguous hierarchical arrangement. A taxonomy is usually represented as a tree, which is a type of graph. Graphs have vertices (or nodes) connected by edges or links. From the "root" or top vertex of the tree (e.g. living organisms), "branches" (edges) split off for each unambiguously unique group (e.g. mammals, fish, birds). The branches continue splitting off branches of their own for each sub-group (e.g. from mammals, the branches might be marsupials and sapiens) until a leaf vertex with no outbound edges is encountered (e.g. from the sapiens sub-group, a leaf vertex would be found for homo sapiens). In one embodiment, a software function, called a graph traversal function, is used to search the taxonomy for the term or phrase of interest. For a taxonomy, the graph is commonly stored in the form called an incidence list, where the graph edges are represented by an array containing pairs of vertices that each edge connects. Since a taxonomy is a directed graph (or digraph), the array is ordered. An example incidence list for a taxonomy might appear as:

| | |
|---|---|
| Living organisms | Fish |
| Living organisms | Insects |
| Living organisms | Mammals |
| ... | |
| Mammals | Marsupials |
| Mammals | Sapiens |

Traversal of such a list is simple in almost any computer programming language. In the case that the incidence list for a taxonomy is stored in an RDB table, the method for searching an RDB would be used. If the term or phrase of interest is found, the entire taxonomy is considered an actual source of information about the term or phrase of interest. Taxonomy instances of the type of interest in certain uses exist on individual personal computers, on individual computers on a computer network, on network server computers, and on a network taxonomy server computers. Network taxonomy servers are special typically high performance computers which are dedicated to the task of supporting taxonomic search functions for a large group of users.

One embodiment of the present invention regards all taxonomy instances as reference structures, and for that reason, the taxonomy in its entirety would be considered a resource even if the term or phrase of interest is not located in the taxonomy.

An ontology is a vocabulary that describes concepts and things and the relations between them in a formal way, and has a pattern for using the vocabulary terms to express something meaningful within a specified domain of interest. The vocabulary is used to make queries and assertions. Ontologies are commonly represented as graphs. In this embodiment, a software function, called a graph traversal function, is used to search the ontology for a vertex, called the vertex of interest, containing the term or phrase of interest. The ontology is searched by tracing the relations (links) from the starting vertex of the ontology until the term or phrase of interest has been found, or all vertices in the ontology have been visited. The graph traversal function used to search an ontology differs from that used to search an taxonomy, firstly because the edges in an ontology are labeled, secondly because the because for each vertex a, edge e, vertex b triple must often be a vertex b, edge e^, vertex a in order to capture the inverse relation between vertex a and vertex b. For example,

| Vertex a | Edge Label | Vertex b |
|---|---|---|
| Alexander | hasMother | Olympias |
| Olympias | motherOf | Alexander |
| Bordeaux | RegionOf | France |
| France | hasRegion | Bordeaux |
| William J. Clinton | sameAs | Bill Clinton |
| Bill Clinton | differentFrom | Billy Bob Clinton |

Traversal is simple, but can be time consuming for large ontologies. Where possible, this embodiment of the invention will utilize indexed ontologies with access and searching semantics based upon RDBMS functionality. If the term or phrase of interest is found, the entire ontology is considered an actual source of information about the term or phrase of interest. Ontology instances can be located on individual personal computers, on each computer on a computer network, on network server computers and on a network ontology server computers. Network ontology servers are special typically high performance computers which are dedicated to the task of supporting semantic search functions for a large group of users.

As is true for instances of taxonomy, one embodiment of the present invention regards ontologies as reference structures, and for that reason, the ontology in its entirety would be considered an actual source of information about the term or phrase of interest even if the term or phrase of interest is not located in the ontology.

After any potential source is located, each potential source must be tested for relevancy to the term or phrase of interest. When searching for documents relevant to a term or phrase, certain levels of identification searching are possible. For example, the name of the file in which the document is stored may contain descriptive text. At a deeper level, the document identified by a resource identification can be searched for its title, or more deeply through its abstract, or more deeply through the entire text of the document. Any of these searches may result in a finding that a document is relevant to the term or phrase utilized in the query. If the searching extends over an extensive text, proximity relationship may also be invoked to limit the number of resources identified as relevant. The test for relevancy can be as simple and narrow as establishing that the potential source contains an exact match to the term or phrase of interest. With improved sophistication, the tests for relevancy will a fortiori more accurately identify more valuable resources from among the potential sources examined Those tests for relevancy in accordance with the invention can include, but are not limited to:

(i) that the potential source contains a match to the singular or plural form of the term or phrase of interest.
(ii) that the potential source contains a match to a synonym of the term or phrase of interest.
(iii) that the potential source contains a match to a word related to the term or phrase of interest (related as might be supplied by a thesaurus).
(iv) that the potential source contains a match to a word related to the term or phrase of interest where the relation between the content of a potential source and the term or phrase of interest is established by an authoritative reference source.
(v) use of a thesaurus such as Merriam-Webster's Thesaurus (a product of Merriam-Webster, Inc) to determine if any content of a potential source located during a search is a synonym of or related to the term or phrase of interest.
(vi) that the potential source contains a match to a word appearing in a definition in an authoritative reference of one of the terms and/or phrases of interest.
(vii) use of a dictionary such as Merriam-Webster's Dictionary (a product of Merriam-Webster, Inc) to determine if any content of a potential source located during a search appears in the dictionary definition of, and is therefore related to, the term or phrase of interest.
(viii) that the potential source contains a match to a word appearing in a discussion about the term or phrase of interest in an authoritative reference source.
(ix) use of an encyclopedia such as the Encyclopedia Britannica (a product of Encyclopedia Britannica, Inc) to determine if any content of a potential source located during a search appears in the encyclopedia discussion of the term or phrase of interest, and is therefore related to the term or phrase of interest.
(x) that a term contained in the potential source has a parent, child or sibling relation to the term or phrase of interest.
(xi) use of a taxonomy to determine that a term contained in the potential source has a parent, child or sibling relation to the term or phrase of interest. In this embodiment, the vertex containing the term or phrase of interest is located in the taxonomy. This is the vertex of interest. For each word located in the contents of the potential source, the parent, siblings and children vertices of the taxonomy are searched by tracing the relations (links) from the vertex of interest to parent, sibling, and children vertices of the vertex of interest. If any of the parent, sibling or children vertices contain the word from the content of the potential source, a match is declared, and the source is considered an actual source of information about the term or phrase of interest. In this embodiment, a software function, called a graph traversal function, is used to locate and examine the parent, sibling, and child vertices of term or phrase of interest.
(xii) that the term or phrase of interest is of degree (length) one semantic distance from a term contained in the potential source.
(xiii) that the term or phrase of interest is of degree (length) two semantic distance from a term contained in the potential source.
(xiv) use of an ontology to determine that a degree (length) one semantic distance separates the source from the term or phrase of interest. In this embodiment, the vertex containing the term or phrase of interest is located in the ontology. This is the vertex of interest. For each word located in the contents of the potential source, the ontology is searched by tracing the relations (links) from the vertex of interest to all adjacent vertices. If any of the adjacent vertices contain the word from the content of the potential source, a match is declared, and the source is considered an actual source of information about the term or phrase of interest.
(xv) uses an ontology to determine that a degree (length) two semantic distance separates the source from the term or phrase of interest. In this embodiment, the vertex containing the term or phrase of interest is located in the ontology. This is the vertex of interest. For each word located in the contents of the potential source, the relevancy test for semantic degree one is performed. If this fails, the ontology is searched by tracing the relations (links) from the vertices adjacent to the vertex of interest to all respective adjacent vertices. Such vertices are semantic degree two from the vertex of interest. If any of the semantic degree two vertices contain the word from the content of the potential source, a match is declared, and the source is considered an actual source of information about the term or phrase of interest.
(xvi) uses a universal ontology such as the CYC Ontology (a product of Cycorp, Inc) to determine the degree (length) of semantic distance from one of the terms and/or phrases of interest to any content of a potential source located during a search.
(xvii) uses a specialized ontology such as the Gene Ontology (a project of the Gene Ontology Consortium) to determine the degree (length) of semantic distance from one of the terms and/or phrases of interest to any content of a potential source located during a search.
(xviii) uses an ontology and for the test, the ontology is accessed and navigated using an Ontology Language (e.g. Web Ontology Language)(OWL) (a project of the World Wide Web Consortium).

After a potential source has been located, passed a relevancy test, and been promoted to a resource, the preferred embodiment of the present invention seeks to decompose the resource into nodes. The two methods of resource decomposition applied in current embodiments of the present invention are word classification and intermediate format. Word classification identifies words as instances of parts of speech (e.g. nouns, verbs, adjectives). Correct word classification often requires a text called a corpus because word classification is dependent upon not what a word is, but how it is used. Although the task of word classification is unique for each human language, all human languages can be decomposed into parts of speech. The human language decomposed by word classification in the preferred embodiment is the English language, and the means of word classification is a natural language parser (NLP) (e.g. GATE, a product of the University of Sheffield, UK). In one embodiment, (a) text is input to the NLP;
(b) the NLP restructures the text into a "document of sentences";
(c) for each "sentence",
 (c1) the NLP encodes a sequence of tokens, where each token is a code for the part of speech of the corresponding word in the sentence.

Where the resource contains at least one formatting, processing, or special character not permitted in plain text, the method is:

(a) text is input to the NLP;
(b) the NLP restructures the text into a "document of sentences";
(c) for each "sentence",
   (c1) the NLP encodes a sequence of tokens, where each token is a code for the part of speech of the corresponding word in the sentence.
   (c2) characters or words that contain characters not recognizable to the NLP are discarded from both the sentence and the sequence of tokens.

By using this second method, resources containing any English language text may be decomposed into nodes, including resources formatted as:
   (i) text (plain text) files.
   (ii) Rich Text Format (RTF) (a standard developed by Microsoft, Inc.). An alternative method is to first obtain clean text from RTF by the intermediate use of a RTF-to-text conversion utility (e.g. RTF-Parser-1.09, a product of Pete Sergeant).
   (iii) Extended Markup Language (XML) (a project of the World Wide Web Consortium) files as described more immediately hereinafter.
   (iv) any dialect of markup language files, including, but not limited to: HyperText Markup Language (HTML) and Extensible HyperText Markup Language (XHTML™) (projects of the World Wide Web Consortium), RuleML (a project of the RuleML Initiative), Standard Generalized Markup Language (SGML) (an international standard), and Extensible Stylesheet Language (XSL) (a project of the World Wide Web Consortium) as described more immediately hereinafter.
   (v) Portable Document Format (PDF) (a proprietary format of Adobe, Inc.) files (by means of the intermediate use of a PDF-to-text conversion utility).
   (vi) MS WORD files e.g. DOC files used to store documents by MS WORD (a word processing software product of Microsoft, Inc.) This embodiment programmatically utilizes a MS Word-to-text parser (e.g. the Apache POI project, a product of Apache.org). The POI project API also permits programmatically invoked text extraction from Microsoft Excel spreadsheet files (XLS). An MS Word file can also be processed by a NLP as a plain text file containing special characters, although XLS files can not.
   (vii) event-information capture log files, including, but not limited to: transaction logs, telephone call records, employee timesheets, and computer system event logs.
   (viii) web pages
   (ix) blog pages For decomposition XML files by means of word classification, decomposition is applied only to the English language content enclosed by XML element opening and closing tags with the alternative being that decomposition is applied to the English language content enclosed by XML element opening and closing tags, and any English language tag values of the XML element opening and closing tags. This embodiment is useful in cases of the present invention that seek to harvest metadata label values in conjunction with content and informally propagate those label values into the nodes composed from the element content. In the absence of this capability, this embodiment relies upon the XML file being processed by a NLP as a plain text file containing special characters. Any dialect of markup language files, including, but not limited to: HyperText Markup Language (HTML) and Extensible HyperText Markup Language (XHTML™) (projects of the World Wide Web Consortium), RuleML (a project of the RuleML Initiative), Standard Generalized Markup Language (SGML) (an international standard), and Extensible Stylesheet Language (XSL) (a project of the World Wide Web Consortium) is processed in essentially identical fashion by the referenced embodiment.

Email messages and email message attachments are decomposed using word classification in a preferred embodiment of the present invention. As described earlier, the same programmatically invoked utilities used to access and search email repositories on individual computers and servers are directed to the extraction of English language text from email message and email attachment files. Depending upon how "clean" the resulting extracted English language text can be made, the NLP used by the present invention will process the extracted text as plain text or plain text containing special characters. Email attachments are decomposed as described earlier for each respective file format.

Decomposition by means of word classification being only one of two methods for decomposition supported by the present invention, the other means of decomposition is decomposition of the information from a resource using an intermediate format. The intermediate format is a first term or phrase paired with a second term or phrase. In a preferred embodiment, the first term or phrase has a relation to the second term or phrase. That relation is either an implicit relation or an explicit relation, and the relation is defined by a context. In one embodiment, that context is a schema. In another embodiment, the context is a tree graph. In a third embodiment, that context is a directed graph (also called a digraph). In these embodiments, the context is supplied by the resource from which the pair of terms or phrases was extracted. In other embodiments, the context is supplied by an external resource. In accordance with one embodiment of the present invention, where the relation is an explicit relation defined by a context, that relation is named by that context.

In an example embodiment, the context is a schema, and the resource is a Relational Database (RDB). The relation from the first term or phrase to the second term or phrase is an implicit relation, and that implicit relation is defined in an RDB. The decomposition method supplies the relation with the pair of concepts or terms, thereby creating a node. The first term is a phrase, meaning that it has more than one part (e.g. two words, a word and a numeric value, three words), and the second term is a phrase, meaning that it has more than one part (e.g. two words, a word and a numeric value, three words).

The decomposition function takes as input the RDB schema. The method includes:
   (A) A first phase, where
      (a) the first term or phrase is the database name, and the second term or phrase is a database table name. Example: database name is "ACCOUNTING", and database table name is "Invoice";
      (b) The relation (e.g. "has") between the first term or phrase ("ACCOUNTING") and the second term or phrase ("Invoice") is recognized as implicit due to the semantics of the RDB schema;
      (c) A node is produced ("Accounting-has-Invoice") by supplying the relation ("has") between the pair of concepts or terms;
      (d) For each table in the RDB, the steps (a) fixed as the database name, (b) fixed as the relation, (c) where the individual table names are iteratively used, produce a node; and
   (B) A second phase, where
      (a) the first term or phrase is the database table name, and the second term or phrase is the database table column name. Example: database table name is "Invoice" and column name is "Amount Due";
(b) The relation (e.g. "has") between the first term or phrase ("Invoice") and the second term or phrase ("Amount Due") is recognized as implicit due to the semantics of the RDB schema;
(c) A node is produced ("Invoice-has-Amount Due") by supplying the relation ("has") between the pair of concepts or terms;
(d) For each column in the database table, the steps (a) fixed as the database table name, (b) fixed as the relation, (c) where the individual column names are iteratively used, produce a node;
(e) For each table in the RDB, step (d) is followed, with the steps (a) where the database table names are iteratively used, (b) fixed as the relation, (c) where the individual column names are iteratively used, produce a node;

In this embodiment, the entire schema of the RDB is decomposed, and because of the implicit relationship being immediately known by the semantics of the RDB, the entire schema of the RDB can be composed into nodes without additional processing of the intermediate format pair of concepts or terms.

In another embodiment, the decomposition function takes as input the RDB schema plus at least two values from a row in the table. The method includes
(a) the first term or phrase is a compound term, with
(b) the first part of the compound term being the database table column name which is the name of the "key" column of the table (for example for table "Invoice", the key column is "Invoice No"), and
(c) the second part of the compound term being the value for the key column from the first row of the table (for example, for the "Invoice" table column "Invoice No." the row 1 value of "Invoice No." is "500024", the row being called the "current row",
(d) the third part of the compound is the column name of a second column in the table (example "Status"),
(e) resulting in the first term or phrase being "Invoice No. 500024 Status";
(f) the second term or phrase is the value from second column, current row Example: second column name is "Status", value of row 1 is "Overdue";
(g) The relation (e.g. "is") between the first term or phrase ("Invoice No. 500024 Status") and the second term or phrase ("Overdue") is recognized as implicit due to the semantics of the RDB schema;
(h) A node is produced ("Invoice No. 500024 Status-is-Overdue") by supplying the relation ("is") between the pair of concepts or terms;
(i) For each row in the table, the steps (b) fixed as the key column name, (c) varying with each row, (d) fixed as name of second column, (f) varying with the value in the second column for each row, with (g) the fixed relation ("is"), produces a node (h);
(j) For each column in the table, step (i) is run;
(k) For each table in the database, step (j) is run;

The entire contents of the RDB can be decomposed, and because of the implicit relationship being immediately known by the semantics of the RDB, the entire contents of the RDB can be composed into nodes without additional processing of the intermediate format pair of terms or phrases.

Where the context is a tree graph, and the resource is a taxonomy, the relation from the first term or phrase to the second term or phrase is an implicit relation, and that implicit relation is defined in a taxonomy.

The decomposition function will capture all the hierarchical relations in the taxonomy. The decomposition method is a graph traversal function, meaning that the method will visit every vertex of the taxonomy graph. In a tree graph, a vertex (except for the root) can have only one parent, but many siblings and many children. The method includes:
(a) Starting from the root vertex of the graph,
(b) visit a vertex (called the current vertex);
(c) If a child vertex to the current vertex exists;
(d) The value of the child vertex is the first term or phrase (example "mammal");
(e) The value of the current vertex is the second term or phrase (example "living organism");
(f) The relation (e.g. "is") between the first term or phrase (child vertex value) and the second term or phrase (parent vertex value) is recognized as implicit due to the semantics of the taxonomy;
(g) A node is produced ("mammal-is-living organism") by supplying the relation ("is") between the pair of concepts or terms;
(h) For each vertex in the taxonomy graph, the steps of (b), (c), (d), (e), (f), (g) are executed;

The parent/child relations of entire taxonomy tree can be decomposed, and because of the implicit relationship being immediately known by the semantics of the taxonomy, the entire contents of the taxonomy can be composed into nodes without additional processing of the intermediate format pair of concepts or terms.

In another embodiment, the decomposition function will capture all the sibling relations in the taxonomy. The method includes:
(a) Starting from the root vertex of the graph,
(b) visit a vertex (called the current vertex);
(c) If more than one child vertex to the current vertex exists;
(d) using a left-to-right frame of reference;
(e) The value of the first child vertex is the first term or phrase (example "humans");
(f) The value of the closest sibling (proximal) vertex is the second term or phrase (example "apes");
(g) The relation (e.g. "related") between the first term or phrase (first child vertex value) and the second term or phrase (other child vertex value) is recognized as implicit due to the semantics (i.e. sibling relation) of the taxonomy;
(h) A node is produced ("humans-related-apes") by supplying the relation ("related") between the pair of concepts or terms;
(i) For each other child (beyond the first child) vertex of the current vertex, the steps of (e), (f), (g), (h) are executed;
(j) For each vertex in the taxonomy graph, the steps of (b), (c), (d), (i) are executed;

All sibling relations in the entire taxonomy tree can be decomposed, and because of the implicit relationship being immediately known by the semantics of the taxonomy, the entire contents of the taxonomy can be composed into nodes without additional processing of the intermediate format pair of terms or phrases.

Where the context is a digraph, and the resource is an ontology, the relation from the first term or phrase to the second term or phrase is an explicit relation, and that explicit relation is defined in an ontology.

The decomposition function will capture all the semantic relations of semantic degree 1 in the ontology. The decomposition method is a graph traversal function, meaning that the method will visit every vertex of the ontology graph. In an ontology graph, semantic relations of degree 1 are represented by all vertices exactly 1 link ("hop") removed from any given vertex. Each link must be labeled with the relation between the vertices. The method includes:
- (a) Starting from the root vertex of the graph,
- (b) visit a vertex (called the current vertex);
- (c) If a link from the current vertex to another vertex exists;
- (d) Using a clockwise frame of reference;
- (e) The value of the current vertex is the first term or phrase (example "husband");
- (f) The value of the first linked vertex is the second term or phrase (example "wife");
- (g) The relation (e.g. "spouse") between the first term or phrase (current vertex value) and the second term or phrase (linked vertex value) is explicitly provided due to the semantics of the ontology;
- (h) A node is produced ("husband-spouse-wife") (meaning formally that "there exists a husband who has a spouse relation with a wife") by supplying the relation ("spouse") between the pair of terms or phrases;
- (i) For each vertex in the taxonomy graph, the steps of (b), (c), (d), (e), (f), (g), (h) are executed;

The degree one relations of entire ontology tree can be decomposed, and because of the explicit relationship being immediately known by the labeled relation semantics of the ontology, the entire contents of the ontology can be composed into nodes without additional processing of the intermediate format pair of terms or phrases.

Nodes are the building blocks of correlation. Nodes are the links in the chain of association from a given origin to a discovered destination. The preferred embodiment and/or exemplary method of the present invention is directed to providing an improved system and method for discovering knowledge by means of constructing correlations using nodes. As soon as the node pool is populated with nodes, correlation can begin. In all embodiments of the present invention, a node is a data structure. A node is comprised of parts. The node parts can hold data types including, but not limited to text, numbers, mathematical symbols, logical symbols, URLs, URIs, and data objects. The node data structure is sufficient to independently convey meaning, and is able to independently convey meaning because the node data structure contains a relation. The relation manifest by the node is directional, meaning that the relationships between the relata may be uni-directional or bi-directional. A uni-directional relationship exists in only a single direction, allowing a traversal from one part to another but no traversal in the reverse direction. A bi-directional relationship allows traversal in both directions.

Figure 4A:
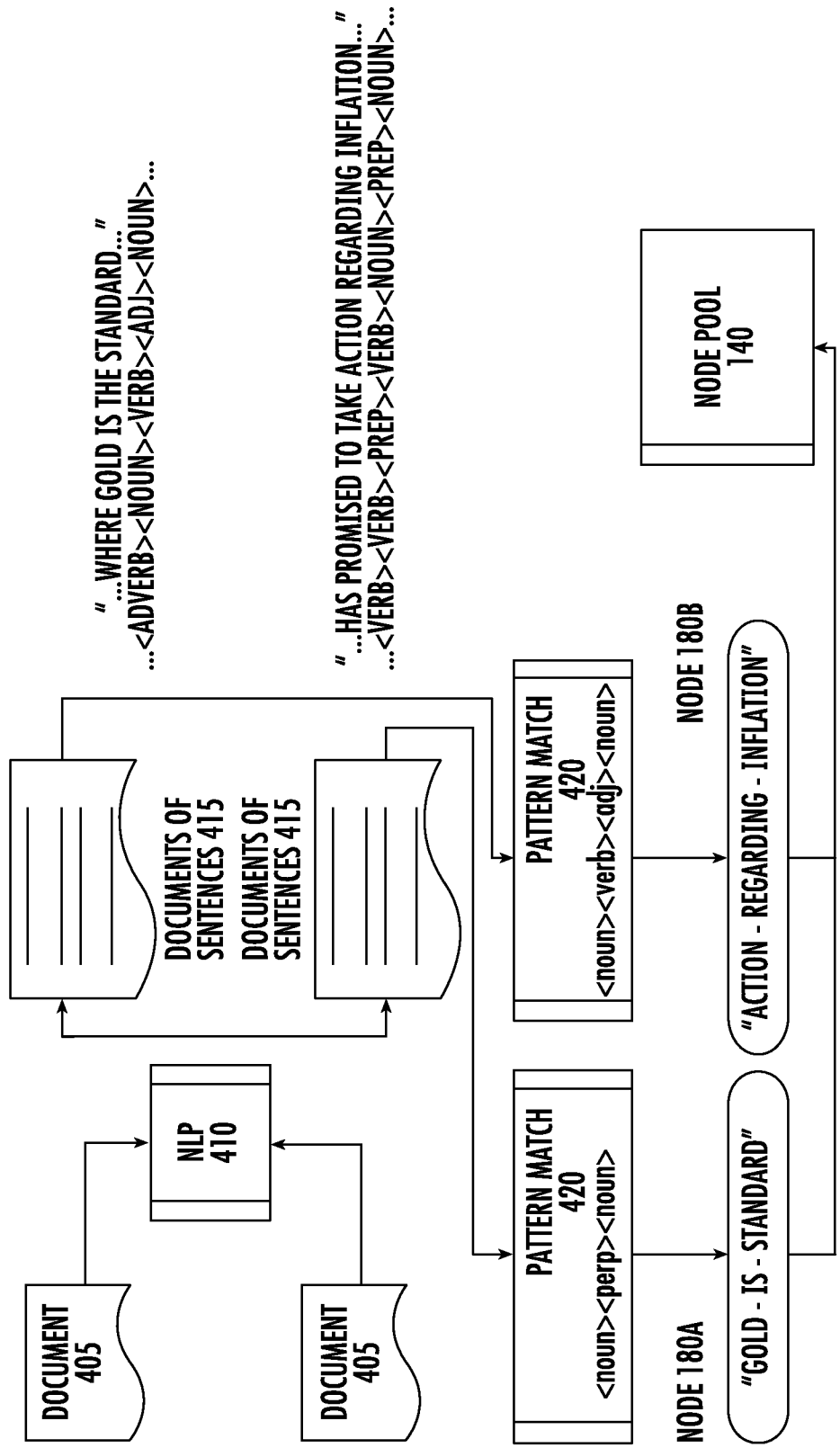
FIG. 4A: illustrates the generation of nodes from natural language English sentences.

A node is a data structure comprised of three parts in one preferred embodiment, and the three parts contain the relation and two relata. The arrangement of the parts is:
- (a) the first part contains the first relatum;
- (b) the second part contains the relation;
- (c) the third part contains the second relatum;

The naming of the parts is:
- (a) the first part, containing the first relatum, is called the subject;
- (b) the second part, containing the relation, is called the bond;
- (c) the third part, containing the second relatum, is called the attribute;

In another preferred embodiment, a node is a data structure and is comprised of four parts. The four parts contain the relation, two relata, and a source. One of the four parts is a source, and the source contains a URL or URI identifying the resource from which the node was extracted. In an alternative embodiment, the source contains a URL or URI identifying an external resource which provides a context for the relation contained in the node. In these embodiments, the four parts contain the relation, two relata, and a source, and the arrangement of the parts is:
- (a) the first part contains the first relatum;
- (b) the second part contains the relation;
- (c) the third part contains the second relatum;
- (d) the fourth part contains the source;

The naming of the parts is:
- (a) the first part, containing the first relatum, is called the subject;
- (b) the second part, containing the relation, is called the bond;
- (c) the third part, containing the second relatum, is called the attribute;
- (d) the fourth part, containing the source, is called the sequence;

Referring to FIG. 4A, the generation of nodes 180A, 180B is achieved using the products of decomposition by a natural language processor (NLP) 410, including at least one sentence of words and a sequence of tokens where the sentence and the sequence must have a one-to-one correspondence 415. All nodes 180A, 180B that match at least one syntactical pattern 420 can be constructed. The method is:
- (a) A syntactical pattern 420 of tokens is selected (example: <noun><preposition><noun>);
- (b) Moving from left to right;
- (c) The sequence of tokens is searched for the center token (<preposition>) of the pattern;
- (d) If the correct token (<preposition>) is located in the token sequence;
- (e) The <preposition> token is called the current token;
- (f) The token to the left of the current token (called the left token) is examined;
- (g) If the left token does not match the pattern,
  - a. the attempt is considered a failure;
  - b. searching of the sequence of tokens is continued from the current token position;
  - c. until a next matching <preposition> token is located;
  - d. or the end of the sequence of tokens is encountered;
- (h) if the left token does match the pattern,
- (i) the token to the right of the current token (called the right token) is examined;
- (j) If the right token does not match the pattern,
  - a. the attempt is considered a failure;
  - b. searching of the sequence of tokens is continued from the current token position;
  - c. until a next matching <preposition> token is located;
  - d. or the end of the sequence of tokens is encountered;
- (k) if the right token matches the pattern,
- (l) a node 180A, 180B is created;
- (m) using the words from the word list that correspond to the <noun><preposition><noun> pattern, example "action regarding inflation";
- (n) searching of the sequence of tokens is continued from the current token position;
- (o) until a next matching <preposition> token is located;
- (p) or the end of the sequence of tokens is encountered;

The generation of nodes is achieved using the products of decomposition by a natural language processor (NLP), including at least one sentence of words and a sequence of tokens where the sentence and the sequence must have a one-to-one correspondence. All nodes that match at least one syntactical pattern can be constructed. The method is:
- (q) A syntactical pattern of tokens is selected (example: <noun><preposition><noun>);
- (r) Moving from left to right;

(s) The sequence of tokens is searched for the center token (<preposition>) of the pattern;
(t) If the correct token (<preposition>) is located in the token sequence;
(u) The <preposition> token is called the current token;
(v) The token to the left of the current token (called the left token) is examined;
(w) If the left token does not match the pattern,
   a. the attempt is considered a failure;
   b. searching of the sequence of tokens is continued from the current token position;
   c. until a next matching <preposition> token is located;
   d. or the end of the sequence of tokens is encountered;
(x) if the left token does match the pattern,
(y) the token to the right of the current token (called the right token) is examined;
(z) If the right token does not match the pattern,
   a. the attempt is considered a failure;
   b. searching of the sequence of tokens is continued from the current token position;
   c. until a next matching <preposition> token is located;
   d. or the end of the sequence of tokens is encountered;
(aa) if the right token matches the pattern,
(bb) a node is created;
(cc) using the words from the word list that correspond to the <noun><preposition><noun> pattern, example "prince among men";
(dd) searching of the sequence of tokens is continued from the current token position;
(ee) until a next matching <preposition> token is located;
(ff) or the end of the sequence of tokens is encountered;

A preferred embodiment of the present invention is directed to the generation of nodes using all sentences which are products of decomposition of a resource. The method includes an inserted step (q) which executes steps (a) through (p) for all sentences generated by the decomposition function of an NLP.

Nodes can be constructed using more than one pattern. The method is:
(1) The inserted step (a1) is preparation of a list of patterns. This list can start with two patterns and extend to essentially all patterns usable in making a node, and include but are not limited to:
   (i)<noun><verb><noun> example: "man bites dog",
   (ii)<noun><adverb><verb> example: "horse quickly runs",
   (iii)<verb><adjective><noun> example: "join big company",
   (iv)<adjective><noun><noun> example: "silent night song",
   (v)<noun><preposition><noun> example: "voters around country";
(2) The inserted step (p1) where steps (a) through (p) are executed for each pattern in the list of patterns;

In an improved approach, nodes are constructed using more than one pattern, and the method for constructing nodes uses a sorted list of patterns. In this embodiment,
The inserted step (a2) sorts the list of patterns by the center token, then left token then right token (example: <adjective> before <noun> before <preposition>), meaning that the search order for the set of patterns (i) through (v) would become (iii)(ii)(iv)(v)(i), and that patterns with the same center token would become a group.
(b)(c) Each sequence of tokens is searched for the first center token in the pattern list i.e. <adjective>
(d) If the correct token (<adjective>) is located in the token sequence;
(e) The located <adjective> token is called the current token;
(e1) Using the current token,
(e2) Each pattern in the list with the same center token (i.e. each member of the group in the pattern list) is compared to the right token, current token, and left token in the sequence at the point of the current token;
(e3) For each group in the search list, steps (b) through (e2) are executed;
(q) steps (b) through (e3) are executed for all sentences decomposed from the resource;

Additional interesting nodes can be extracted from a sequence of tokens using patterns of only two tokens. The method searches for the right token in the patterns, and the bond value of constructed nodes is supplied by the node constructor. In another variation, the bond value is determined by testing the singular or plural form of the subject (corresponding to the left token) value. In this embodiment,
(a) The pattern is <noun><adjective>;
(b) Moving from left to right;
(c) The sequence of tokens is searched for the token <adjective>;
(d) If the correct token (<adjective>) is located in the token sequence;
(e) The <adjective> token is called the current token;
(f) The token to the left of the current token (called the left token) is examined;
(g) If the left token does not match the pattern (<noun>),
   a. the attempt is considered a failure;
   b. searching of the sequence of tokens is continued from the current token position;
   c. until a next matching <adjective> token is located;
   d. or the end of the sequence of tokens is encountered;
(h) if the left token does match the pattern,
(i) a node is created;
(j) using the words from the word list that correspond to the <noun><adjective> pattern, example "mountain big";
(k) the subject value of the node (corresponding to the <noun> position in the pattern) is tested for singular or plural form
(l) a bond value for the node is inserted based upon the test (example "is" "are")
(m) resulting in the node "mountain is big"
(n) searching of the sequence of tokens is continued from the current token position;
(o) until a next matching <adjective> token is located;
(p) or the end of the sequence of tokens is encountered;
(q) steps (a) through (p) are executed for all sentences decomposed from the resource;

Using a specific pattern of three tokens, the method for constructing nodes searches for the left token in the patterns, the bond value of constructed nodes is supplied by the node constructor, and the bond value is determined by testing the singular or plural form of the subject (corresponding to the left token) value. In this embodiment,
(a) The pattern is <adjective><noun><noun>;
(b) Moving from left to right;
(c) The sequence of tokens is searched for the token <adjective>;
(d) If the correct token (<adjective>) is located in the token sequence;
(e) The <adjective> token is called the current token;
(f) The token to the right of the current token (called the center token) is examined;

(g) If the center token does not match the pattern (<noun>),
  a. the attempt is considered a failure;
  b. searching of the sequence of tokens is continued from the current token position;
  c. until a next matching <adjective> token is located;
  d. or the end of the sequence of tokens is encountered;
(h) if the center token does match the pattern,
(i) The token to the right of the center token (called the right token) is examined;
(j) If the right token does not match the pattern (<noun>),
  a. the attempt is considered a failure;
  b. searching of the sequence of tokens is continued from the current token position;
  c. until a next matching <adjective> token is located;
  d. or the end of the sequence of tokens is encountered;
(k) if the center token does match the pattern,
(l) a node is created;
(m) using the words from the word list that correspond to the <adjective><noun><noun> pattern, example "silent night song";
(n) the attribute value of the node (corresponding to the right token <noun> position in the pattern) is tested for singular or plural form
(o) a bond value for the node is inserted based upon the test (example "is" "are")
(p) resulting in the node "silent night is song"
(q) searching of the sequence of tokens is continued from the current token position;
(r) until a next matching <adjective> token is located;
(s) or the end of the sequence of tokens is encountered;
(t) steps (a) through (s) are executed for all sentences decomposed from the resource;

Nodes are constructed using patterns where the left token is promoted to a left pattern containing two or more tokens, the center token is promoted to a center pattern containing no more than two tokens, and the right token is promoted to a right pattern containing two or more tokens. By promoting left, center, and right tokens to patterns, more complex and sophisticated nodes can be generated. In this embodiment, the NLP's use of the token "TO" to represent the literal "to" can be exploited. For example,
  (i) <adjective><noun><verb><adjective><noun>"large contributions fight world hunger",
  (ii) <noun><TO><verb><noun>"legislature to consider bill",
  (iii) <noun><adverb><verb><adjective><noun>"people quickly read local news"

For example, using <noun><TO><verb><noun>"legislature to consider bill",
  (a) Separate lists of patterns for left pattern, center pattern, and right pattern are created and referenced;
  (b) The leftmost token from the center pattern is used as the search
  (c) If the correct token (<TO>) is located in the token sequence;
  (d) The <TO> token is called the current token;
  (e) The token to the right of the current token (called the right token in the context of the center patterns) is examined;
  (f) If the token does not match any center pattern right token,
    a. the attempt is considered a failure;
    b. searching of the sequence of tokens is continued from the current token position;
    c. until a next matching <TO> token is located;
    d. or the end of the sequence of tokens is encountered;
  (g) if the right token does match the pattern of the center pattern (<TO><verb>),
  (h) the token to the left of the current token (called the right token in the context of the left patterns) is examined;
  (i) If the right token does not match any left pattern right token,
    a. the attempt is considered a failure;
    b. searching of the sequence of tokens is continued from the current token position;
    c. until a next matching <TO> token is located;
    d. or the end of the sequence of tokens is encountered;
  (j) if the right token matches the pattern,
  (k) The token to the right of the current token (called the right token in the context of the center patterns) becomes the current token;
  (l) The token to the right of the current token (called the left token in the context of the right patterns) is examined;
  (m) If the token does not match any right pattern left token,
    a. the attempt is considered a failure;
    b. searching of the sequence of tokens is continued from the current token position;
    c. until a next matching <TO> token is located;
    d. or the end of the sequence of tokens is encountered;
  (n) if the left token does match the pattern of the right pattern (<noun>),
  (o) a node is created;
  (p) using the words from the word list that correspond to the <noun><TO><verb><noun>"legislature to consider bill",
  (q) searching of the sequence of tokens is continued from the current token position;
  (r) until a next matching <preposition> token is located;
  (s) or the end of the sequence of tokens is encountered;

Under certain conditions, it is desirable to filter out certain possible node constructions. Those filters include, but are not limited to:
  (i) All words in subject, bond, and attribute are capitalized;
  (ii) Subject, bond, or attribute start or end with a hyphen or an apostrophe;
  (iii) Subject, bond, or attribute have a hyphen plus space ("- ") or space plus hyphen (" -") or hyphen plus hyphen ("--") embedded in any of their respective values;
  (iv) Subject, bond, or attribute contain sequences greater than length three (3) of the same character (ex: "FFFF");
  (v) Subject, bond, or attribute contain a multi-word value where the first word or the last word of the multi-word value is only a single character (ex: "a big");
  (vi) Subject and attribute are singular or plural forms of each other;
  (vii) Subject and attribute are identical or have each other's value embedded (ex: "dog" "sees" "big dog");
  (viii) Subject, bond, or attribute respectively contain two identical words (ex: "Texas Texas" "is" "state");

Where the nodes are comprised of four parts, the fourth part contains a URL or URI of the resource from which the node was extracted. In this embodiment, in addition to the sentence (sequence of words and corresponding sequence of tokens), the URL or URI from which the sentence was extracted is passed to the node generation function. For every node created from the sentence by the node generation function, the URL or URI is loaded into the fourth part, called the sequence, of the node data structure.

Where the four part nodes are generated using the RDB decomposition function, the RDB decomposition function will place in the fourth (sequence) part of the node the URL or URI of the RDB resource from which the node was extracted, typically, the URL by which the RDB decomposition function itself created a connection to the database. An example using the Java language Enterprise version, using a well known RDBMS called MySQL and a database called "mydb": "jdbc:mysql://localhost/mydb". If the RDBMS is a Microsoft Access database, the URL might be the file path, for example: "c:\anydatabase.mdb". This embodiment is constrained to those RDBMS implementations where the URL for the RDB is accessible to the RDB decomposition function. Note that the URL of a database resource is usually not sufficient to programmatically access the resource.

Where the nodes are generated using the taxonomy decomposition function, the taxonomy decomposition function will place in the fourth (sequence) part of the node the URL or URI of the taxonomy resource from which the node was extracted, typically, the URL by which the taxonomy decomposition function itself located the resource.

Where the nodes are generated using the ontology decomposition function, the ontology decomposition function will place in the fourth (sequence) part of the node the URL or URI of the ontology resource from which the node was extracted, typically, the URL by which the ontology decomposition function itself located the resource.

A preferred embodiment of the present invention is directed to the generation of nodes where the nodes are added to a node pool, and a rule is in place to block duplicate nodes from being added to the node pool. In this embodiment, (a) a candidate node is converted to a string value using the Java language feature "toString( )", (b) a lookup of the string as a key is performed using the lookup function of the node pool. Candidate nodes (c) found to have identical matches already present in the node pool are discarded. Otherwise, (d) the node is added to the node pool.

Nodes in a node pool transiently reside or are persisted on a computing device, a computer network-connected device, or a personal computing device. Well known computing devices include, but are not limited to super computers, mainframe computers, enterprise-class computers, servers, file servers, blade servers, web servers, departmental servers, and database servers. Well known computer network-connected devices include, but are not limited to internet gateway devices, data storage devices, home internet appliances, set-top boxes, and in-vehicle computing platforms. Well known personal computing devices include, but are not limited to, desktop personal computers, laptop personal computers, personal digital assistants (PDAs), advanced display cellular phones, advanced display pagers, and advanced display text messaging devices.

The storage organization and mechanism of the node pool permits efficient selection and retrieval of an individual node by means of examination of the direct or computed contents (values) of one or more parts of a node. Well known computer software and data structures that permit and enable such organization and mechanisms include but are not limited to relational database systems, object database systems, file systems, computer operating systems, collections, hash maps, maps (associative arrays), and tables.

The nodes stored in the node pool are called member nodes. With respect to correlation, the node pool is called a search space. The node pool must contain at least one node member that explicitly contains a term or phrase of interest. In this embodiment, the node which explicitly contains the term or phrase of interest is called the origin node, synonymously referred to as the source node, synonymously referred to as the path root.

Correlations are constructed in the form of a chain (synonymously referred to as a path) of nodes. The chain is constructed from the node members of the node pool (called candidate nodes), and the method of selecting a candidate node to add to the chain is to test that a candidate node can be associated with the current terminus node of the chain. The tests for association are:

(i) that the value of the (leftmost) subject part of a candidate node contains an exact match to the (rightmost) attribute part of the current terminus node.

(ii) that the value of the subject part of a candidate node contains a match to the singular or plural form of the attribute part of the current terminus node.

(iii) that the value of the subject part of a candidate node contains a match to a word related (for example, as would a thesaurus) to the attribute part of the current terminus node.

(iv) that the value of the subject part of a candidate node contains a match to a word related to the attribute part of the current terminus node and the relation between the candidate node subject part and the terminus node attribute part is established by an authoritative reference source.

(v) that the value of the subject part of a candidate node contains a match to a word related to the attribute part of the current terminus node, the relation between the candidate node subject part and the terminus node attribute part is established by an authoritative reference source, and association test uses a thesaurus such as Merriam-Webster's Thesaurus (a product of Merriam-Webster, Inc) to determine if the value of the subject part of a candidate node is a synonym of or related to the attribute part of the current terminus node.

(vi) that the value of the subject part of a candidate node contains a match to a word appearing in a definition in an authoritative reference of the attribute part of the current terminus node.

(vii) that the value of the subject part of a candidate node contains a match to a word related to the attribute part of the current terminus node, the relation between the candidate node subject part and the terminus node attribute part is established by an authoritative reference source, and association test uses a dictionary such as Merriam-Webster's Dictionary (a product of Merriam-Webster, Inc) to determine if the subject part of a candidate node appears in the dictionary definition of, and is therefore related to the attribute part of the current terminus node.

(viii) that the value of the subject part of a candidate node contains a match to a word appearing in a discussion about the attribute part of the current terminus node in an authoritative reference source.

(ix) that the value of the subject part of a candidate node contains a match to a word related to the attribute part of the current terminus node, the relation between the candidate node subject and the terminus node attribute is established by an authoritative reference source, and association test uses an encyclopedia such as the Encyclopedia Britannica (a product of Encyclopedia Britannica, Inc) to determine if any content of a potential source located during a search appears in the encyclopedia discussion of the term or phrase of interest, and is therefore related to the attribute part of the current terminus node.

(x) that a term contained in the value of the subject part of a candidate node has a parent, child or sibling relation to the attribute part of the current terminus node.

(xi) that the value of the subject part of a candidate node contains a match to a word related to the attribute part of the current terminus node, the relation between the candidate node subject and the terminus node attribute is established by an authoritative reference source, and the association test uses a taxonomy to determine that a term contained in the subject part of a candidate node has a parent, child or sibling relation to the attribute part of the current terminus node. The vertex containing the value of the attribute part of the current terminus node is located in the taxonomy. This is the vertex of interest. For each word located in the subject part of a candidate node, the parent, sibling and child vertices of the vertex of interest are searched by tracing the relations (links) from the vertex of interest to parent, sibling, and child vertices of the vertex of interest. If any of the parent, sibling or child vertices contain the word from the attribute part of the current terminus node, a match is declared, and the candidate node is considered associated with the current terminus node. In this embodiment, a software function, called a graph traversal function, is used to locate and examine the parent, sibling, and child vertices of the current terminus node.

(xii) that a term contained in the value of the subject part of a candidate node is of degree (length) one semantic distance from a term contained in the attribute part of the current terminus node.

(xiii) that a term contained in the subject part of a candidate node is of degree (length) two semantic distance from a term contained in the attribute part of the current terminus node.

(xiv) the subject part of a candidate node is compared to the attribute part of the current terminus node and the association test uses an ontology to determine that a degree (length) one semantic distance separates the subject part of a candidate node from the attribute part of the current terminus node. The vertex containing the attribute part of the current terminus node is located in the ontology. This is the vertex of interest. For each word located in the subject part of a candidate node, the ontology is searched by tracing the relations (links) from the vertex of interest to all adjacent vertices. If any of the adjacent vertices contain the word from the subject part of a candidate node, a match is declared, and the candidate node is considered associated with the current terminus node.

(xv) the subject part of a candidate node is compared to the attribute part of the current terminus node and the association test uses an ontology to determine that a degree (length) two semantic distance separates the subject part of a candidate node from the attribute part of the current terminus node. The vertex containing the attribute part of the current terminus node is located in the ontology. This is the vertex of interest. For each word located in the subject part of a candidate node, the relevancy test for semantic degree one is performed. If this fails, the ontology is searched by tracing the relations (links) from the vertices adjacent to the vertex of interest to all respective adjacent vertices. Such vertices are semantic degree two from the vertex of interest. If any of the semantic degree two vertices contain the word from the subject part of a candidate node, a match is declared, and the candidate node is considered associated with the current terminus node.

(xvi) the subject part of a candidate node is compared to the attribute part of the current terminus node and the association test uses a universal ontology such as the CYC Ontology (a product of Cycorp, Inc) to determine the degree (length) of semantic distance from the attribute part of the current terminus node to the subject part of a candidate node.

(xvii) the subject part of a candidate node is compared to the attribute part of the current terminus node and the association test uses a specialized ontology such as the Gene Ontology (a project of the Gene Ontology Consortium) to determine the degree (length) of semantic distance from the attribute part of the current terminus node to the subject part of a candidate node.

(xviii) the attribute part of the current terminus node is compared to the attribute part of the current terminus node and the association test uses an ontology and for the test, the ontology is accessed and navigated using an Ontology Language (e.g. Web Ontology Language) (OWL) (a project of the World Wide Web Consortium).

An improved embodiment of the present invention is directed to the node pool, where the node pool is organized as clusters of nodes indexed once by subject and in addition, indexed by attribute. This embodiment is improved with respect to the speed of correlation, because only one association test is required for the cluster in order that all associated nodes can be added to correlations.

The correlation process consists of the iterative association with and successive chaining of qualified node members of the node pool to the successively designated current terminus of the path. Until success or failure is resolved, the process is a called a trial or attempted correlation. When the association and chaining of a desired node called the target or destination node to the current terminus of the path occurs, the trial is said to have achieved a success outcome (goal state), in which case the path is thereafter referred to as a correlation, and such correlation is preserved, while the condition of there being no further qualified member nodes in the node pool being deemed a failure outcome (exhaustion), and the path is discarded, and is not referred to as a correlation.

Designation of a destination node invokes a halt to correlation. There are a number of means to halt correlation. In a preferred embodiment, the user of the software elects at will to designate the node most recently added to the end of the correlation as the destination node, and thereby halts further correlation. The user is provided with a representation of the most recently added node after each step of the correlation method, and is prompted to halt or continue the correlation by means of a user interface, such as a graphical user interface (GUI). Other ways to halt correlation are:

(i) having the correlation method continue to extend a correlation until a set time interval has elapsed, at which point the correlation method will designate the node most recently added to the end of the correlation as the destination node, and thereby halt further correlation.

(ii) having the correlation method continue to extend a correlation until the correlation achieves a certain preset degree (i.e. length, in number of nodes), at which point the correlation method will designate the node most recently added to the end of the correlation as the destination node, and thereby halt further correlation.

(iii) having the correlation method continue to extend a correlation until the correlation can not be extended further given the nodes available in the node pool, at which point the correlation method will designate the node most recently added to the end of the correlation as the destination node, and thereby halt further correlation.

(iv) having the correlation method continue to extend a correlation until a specific pre-selected target node or a target node with a pre-designated term in the subject part is added to the correlation, upon which event a success is declared and correlation is halted. In this embodiment, if the pre-selected node or a node with a pre-designated term can not be associated with the correlation and all candidate nodes in the node pool have been examined, a failure is declared correlation is halted.
(v) the correlation method compares the number of trial correlations to a pre-set limit of trial correlations, and if that limit is reached, halts correlation.
(vi) the correlation method compares the elapsed time of the current correlation to a pre-set time limit, and if that time limit is reached, halts correlation.

In a preferred embodiment of the present invention, the correlation method utilizes graph-theoretic techniques. As a result, the attempts at correlation are together modeled as a directed graph (also called a digraph) of trial correlations.

A preferred embodiment of the present invention is directed to the correlation method where the attempts at correlation utilize graph-theoretic techniques, and as a result, the attempts at correlation are together modeled as a directed graph (also called a digraph) of trial correlations. One type of digraph constructed by the correlation method is a quiver of paths, where each path in the quiver of paths is a trial correlation. This preferred embodiment constructs the quiver of paths using a series of passes through the node pool, and includes the steps of
(a) In the first pass only,
   a. Starting from the origin node,
   b. For each candidate node successfully associated with the origin node,
   c. A new trial correlation (path) is started;
(b) For all subsequent passes
   a. For each trial correlation path,
      i. The current trial correlation path is the trial of interest;
      ii. The terminus (rightmost) node of the path becomes the node of interest;
      iii. The node pool is searched for a candidate node that can be associated with the node of interest, thereby extending the trial correlation by one degree;
      iv. If a node is found that can be associated with the node of interest, the node is added to the trial correlation path. This use of the node is non-exclusive;
      v. If a node added to the trial correlation path is designated the target or destination node,
         1. The trial is referred to as a correlation;
         2. The correlation is removed from the quiver of paths;
         3. The correlation is stored separately as a successful correlations;
         4. The correlation method declares success;
         5. The next trial correlation path becomes the trial of interest;
      vi. If more than one node can be found that can be associated with the node of interest,
      vii. For each such node,
      viii. The current path is cloned, and extended with the node;
      ix. If no candidate node can be found to associate with the current node of interest,
      x. the path of interest is discarded;
   b. step "a." is executed for all trial correlation paths;
(c) step (b) is executed as successive passes until correlation is halted;
(d) if no successful correlations have been constructed, the correlation method declares a failure;

The successful correlations produced by the correlation method are together modeled as a directed graph (also called a digraph) of correlations in one preferred embodiment. Alternatively, the successful correlations produced by the correlation method are together modeled as a quiver of paths of successful correlations. Successful correlations produced by the correlation method are together called, with respect to correlation, the answer space. Where the correlation method constructs a quiver of paths where each path in the quiver of paths is a successful correlation, all successful correlations share as a starting point the origin node, and all possible correlations from the origin node are constructed. All correlations (paths) that start from the same origin term-node and terminate with the same target term-node or the same set of related target term-nodes comprise a correlation set. Target term-nodes are considered related by passing the same association test used by the correlation method to extend trial correlations with candidate nodes from the node pool.

The special case of correlation is constructing knowledge correlations using two terms and/or phrases include
(a) traversing (searching) one or more of
   (vii) computer file systems
   (viii) computer networks including the Internet
   (ix) relational databases
   (x) taxonomies
   (xi) ontologies
(b) to identify actual and potential sources for information about the first of the terms or phrases of interest.
(c) A second, independent search is then performed to identify actual and potential sources for information about the second of the terms or phrases of interest.
(d) A test for relevancy is applied to all actual or potential sources of information discovered in either search
(e) Resources discovered in both searches are decomposed into nodes
(f) And added to the node pool
(g) A node in the node pool that explicitly contains the first term or phrase of interest is used as the origin node.
(h) The correlation is declared a success when a qualified member term-node that explicitly contains the second term or phrase of interest, designated as the destination node, is associated with and added to the current terminus of the path in at least one successful correlation.

Node suppression allows a user to "steer" the correlation by hiding individual nodes from the correlation method. Individual nodes in the node pool can be designated as suppressed. In this embodiment, suppression renders a node ineligible for correlation, but does not delete the node from the node pool. In a preferred use, nodes are suppressed by user action in a GUI component such as a node pool editor. At any moment, the contents of any data store manifest a state for that data store. Suppression changes the state of the node pool as search space and knowledge domain. Suppression permits users to influence the correlation method.

Under certain conditions, it is desirable to filter out certain possible correlation constructions. Those filters include, but are not limited to:
(i) Duplicate node already in the correlation;
(ii) Duplicate subject in node already in the correlation;
(iii) Suppressed node;

An interesting statistics-based improved embodiment of the present invention requires the correlation method to keep track of all terms in all nodes added to a correlation path and, when the frequency of occurrence of any term approaches statistical significance, the correlation method will add an independent search for sources of information about the significant term. In this embodiment, correlation is not paused while nodes from resources that are captured by this search are added to the node pool. Instead, nodes are added as soon as they are generated, thereby seeking to improve later, subsequent correlation trials.

The correlation method will add, in one embodiment, an independent search for sources of information about all terms in a list of terms provided as a file or by user input. All terms beyond the fifth such term are used to orthogonally extend the node pool as search space and knowledge domain. In a variation, the correlation method will add an independent search for sources of information about a third, fourth or fifth term, or about all terms in a list of terms provided as a file or by user input, but the correlation method will limit the scope of the search for all such terms compared to the scope of search used by the correlation method for the first and/or second concept and/or term. In this embodiment, the correlation method is applying a rule that binds the significance of a term to its ordinal position in an input stream Another exemplary embodiment and/or exemplary method of the present invention is directed to the correlation method by which the knowledge discovered by the correlation is previously undiscovered knowledge (i.e. new knowledge) or knowledge which has not previously been known or documented, even in industry specific or academic publications.

Representation to the user of the products of correlation can include:
 (i) presentation of completed correlations where the completed correlations are displayed graphically.
 (ii) presentation of completed correlations where the completed correlations are displayed graphically and the graphical structure for presentation is that of a menu tree.
 (iii) presentation of completed correlations where the completed correlations are displayed graphically and the graphical structure for the presentation is that of a graph.
 (iv) presentation of completed correlations where the completed correlations are displayed graphically and the structure for the presentation is that of a table.

Appendix A depicts the first 4 pages of approximately 222 pages of output showing correlations that resulted from the input terms "Gold is standard." The entire output is available on the accompanying CD-ROM.

While various embodiments of the present invention have been illustrated herein in detail, it should be apparent that modifications and adaptations to those embodiments may occur to those skilled in the art without departing from the scope of the present invention as set forth in the following claims.

What is claimed is:

1. A method for identifying knowledge comprising:
 using an input device coupled to a processor and associated memory for receiving at least one input term;
 using the processor and the associated memory for searching at least one source of information to identify resources comprising information associated with the at least one input term;
 using the processor and the associated memory for decomposing the resources into a plurality of nodes so that each node comprises a data structure including a subject, an attribute, and a word based relational bond therebetween to represent a relation between the subject and the attribute, each node also conveying meaning of the relation independently of other nodes in the plurality of nodes;
 using the processor and the memory for storing the plurality of nodes in a node pool; and
 using the processor and the associated memory for generating correlations of the node pool representing knowledge associated with the at least one input term by at least iteratively adding nodes from the node pool onto an end of a chain of nodes by searching the node pool for a match between an attribute of a chained node and a subject of another unchained node in the node pool, the iterative adding of nodes ending when the node pool is exhausted of candidate nodes or when a current terminus node is a destination node.

2. The method of claim 1 wherein the receiving comprises receiving a natural language description of a concept, and parsing the natural language description into tokens.

3. The method of claim 1 wherein the searching comprises at least one of searching files on a personal computer, and searching files on a network server.

4. The method of claim 1 wherein the searching comprises using at least one spider to explore files.

5. The method of claim 4 wherein the at least one spider clones other spiders for searching.

6. The method of claim 4 wherein the at least one spider comprises a meta-crawler.

7. The method of claim 1 wherein the decomposing of the resources comprises natural language parsing and discarding any characters that are not permissible to be used in constructing tokens in the language.

8. The method of claim 1 wherein the node pool permits selection and retrieval of individual nodes based on the contents of at least one part of a node.

9. The method of claim 1 wherein the node pool permits selection and retrieval using a hash map.

10. The method of claim 1 wherein the node pool is a database.

11. A non-transitory computer-readable medium having instructions stored thereon which, when executed by a computer, cause the computer to perform a method for identifying knowledge comprising:
 receiving at least one input term;
 searching at least one source of information to identify resources comprising information associated with the at least one input term;
 decomposing the resources into a plurality of nodes so that each node comprises a data structure including a subject, an attribute, and a word based relational bond therebetween to represent a relation between the subject and the attribute, each node also conveying meaning of the relation independently of other nodes in the plurality of nodes;
 storing the plurality of nodes in a node pool; and
 generating correlations of the node pool representing knowledge associated with the at least one input term by at least iteratively adding nodes from the node pool onto an end of a chain of nodes by searching the node pool for a match between an attribute of a chained node and a subject of another unchained node in the node pool, the iterative adding of nodes ending when the node pool is exhausted of candidate nodes or when a current terminus node is a destination node.

12. The non-transitory computer-readable medium of claim 11 wherein the receiving comprises receiving a natural language description of a concept, and parsing the natural language description into tokens.

13. The non-transitory computer-readable medium of claim 11 wherein the searching comprises at least one of searching files on a personal computer, and searching files on a network server.

14. The non-transitory computer-readable medium of claim 11 wherein the searching comprises using at least one spider to explore files.

15. The non-transitory computer-readable medium of claim 14 wherein the at least one spider clones other spiders for searching.

16. The non-transitory computer-readable medium of claim 14 wherein the at least one spider comprises a meta-crawler.

17. The non-transitory computer-readable medium of claim 11 wherein the decomposing of the resources comprises natural language parsing and discarding any characters that are not permissible to be used in constructing tokens in the language.

18. The non-transitory computer-readable medium of claim 11 wherein the node pool permits selection and retrieval of individual nodes based on the contents of at least one part of a node.

19. The non-transitory computer-readable medium of claim 11 wherein the node pool permits selection and retrieval using a hash map.

20. The non-transitory computer-readable medium of claim 11 wherein the node pool is a database.

* * * * *